US011392503B2

(12) United States Patent
Gabor et al.

(10) Patent No.: US 11,392,503 B2
(45) Date of Patent: *Jul. 19, 2022

(54) MEMORY TAGGING APPARATUS AND METHOD

(71) Applicant: Intel Corporation, Santa Clara, CA (US)

(72) Inventors: Ron Gabor, Herzliya (IL); Raanan Sade, Kibutz Sarid (IL); Igor Yanover, Yokneam Illit (IL); Assaf Zaltsman, Haifa (IL); Tomer Stark, Tirat Carmel (IL)

(73) Assignee: INTEL CORPORATION, Santa Clara, CA (US)

( * ) Notice: Subject to any disclaimer, the term of this patent is extended or adjusted under 35 U.S.C. 154(b) by 132 days.

This patent is subject to a terminal disclaimer.

(21) Appl. No.: 16/728,573

(22) Filed: Dec. 27, 2019

(65) Prior Publication Data

US 2021/0200686 A1 Jul. 1, 2021

(51) Int. Cl.
*G06F 12/00* (2006.01)
*G06F 12/1009* (2016.01)
*G06F 9/30* (2018.01)

(52) U.S. Cl.
CPC ...... *G06F 12/1009* (2013.01); *G06F 9/30043* (2013.01); *G06F 2212/65* (2013.01)

(58) Field of Classification Search
CPC ............. G06F 12/1009; G06F 9/30043; G06F 2212/65
See application file for complete search history.

(56) References Cited

U.S. PATENT DOCUMENTS

| 2008/0140935 | A1* | 6/2008 | Cypher | G06F 12/0842 711/118 |
|---|---|---|---|---|
| 2013/0262816 | A1* | 10/2013 | Ronen | G06F 12/1036 711/207 |
| 2014/0189881 | A1* | 7/2014 | Lindsay | G06F 21/79 726/27 |
| 2016/0292075 | A1* | 10/2016 | Mohan | G06F 12/1036 |
| 2017/0277639 | A1* | 9/2017 | Awad | G06F 12/1027 |
| 2018/0365152 | A1* | 12/2018 | Jacobi | G06F 12/1009 |

* cited by examiner

*Primary Examiner* — Gurtej Bansal
(74) *Attorney, Agent, or Firm* — Nicholson De Vos Webster & Elliott LLP

(57) ABSTRACT

An apparatus and method for tagged memory management. For example, one embodiment of a processor comprises: execution circuitry to execute instructions and process data, at least one instruction to generate a system memory access request having a first address pointer; and address translation circuitry to determine whether to translate the first address pointer with or without metadata processing, wherein if the first address pointer is to be translated with metadata processing, the address translation circuitry to: perform a lookup in a memory metadata table to identify a memory metadata value, determine a pointer metadata value associated with the first address pointer, and compare the memory metadata value with the pointer metadata value, the comparison to generate a validation of the memory access request or a fault condition, wherein if the comparison results in a validation of the memory access request, then accessing a set of one or more address translation tables to translate the first address pointer to a first physical address and to return the first physical address responsive to the memory access request.

30 Claims, 22 Drawing Sheets

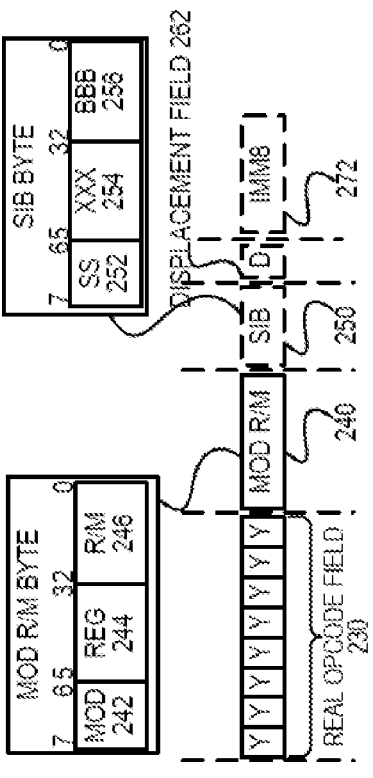
FIG. 2A
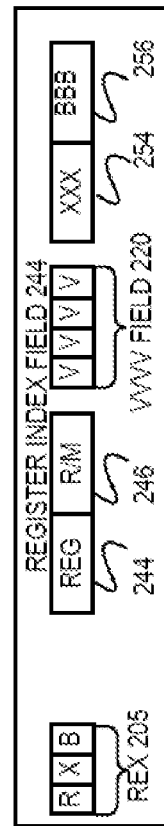
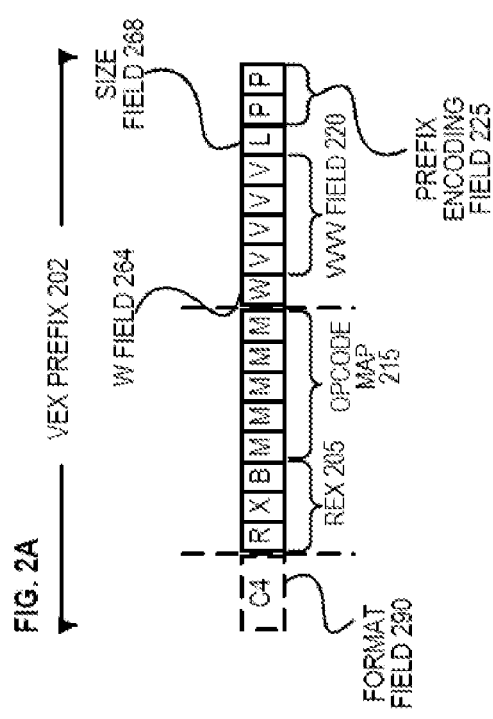
FIG. 2B
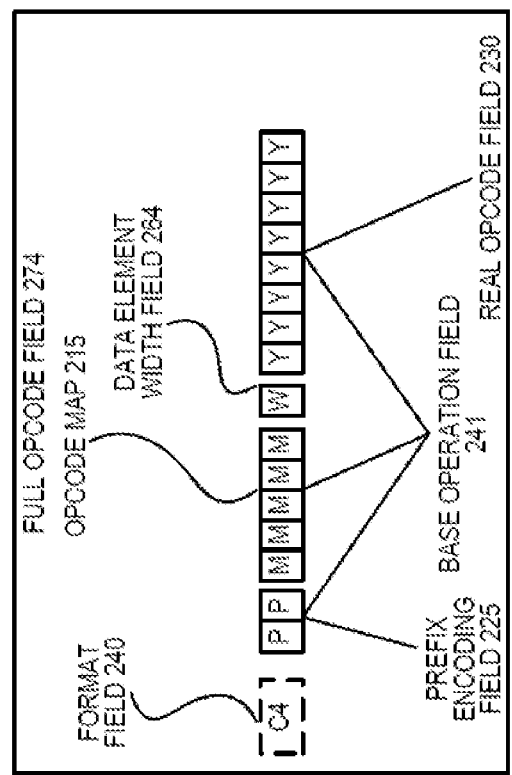
FIG. 2C

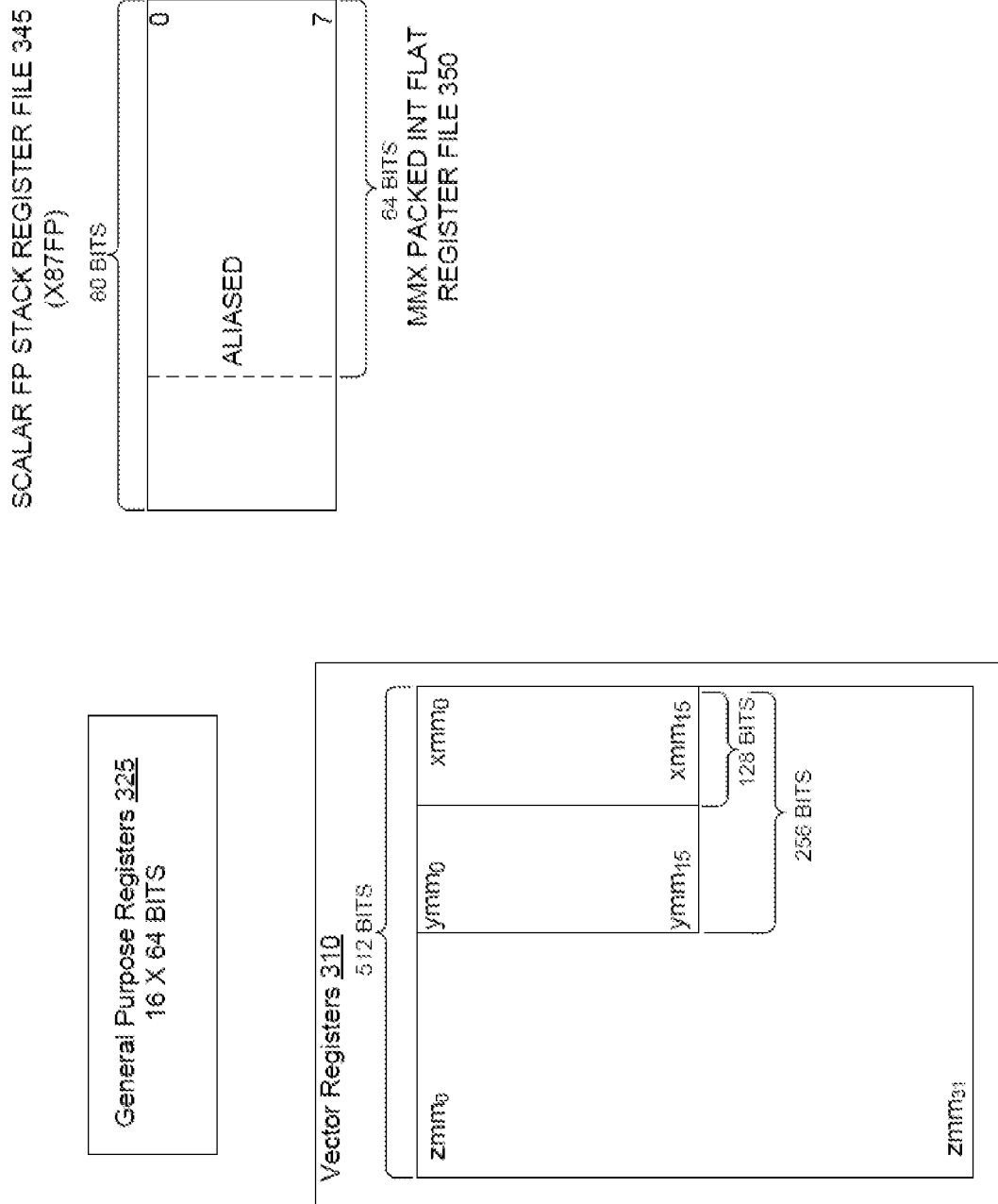

MEMORY TAGGING APPARATUS AND METHOD

BACKGROUND

Field of the Invention

The embodiments of the invention relate generally to the field of computer processors. More particularly, the embodiments relate to a memory management apparatus and method for compartmentalization using linear address metadata.

Description of the Related Art

In current processors, a virtual address is translated to a physical address using a set of page tables managed by the processor's address translation circuitry. A pointer stored in one or more control registers (e.g., a CR3 register) points to a base translation table and different portions of the virtual address are used to identify different levels of translation tables to generate the physical address.

Memory Tagging Technology (MU) provides for the attachment of metadata to pointers and to memory regions. The metadata is subsequently used as a security mechanism when performing loads from or stores to memory.

Existing software-based solutions have high performance overheads (e.g., on the order of a 20×-100× slowdown), which limit their use to debug and pre-production quality assessments. Even when such tools are used, escapees still exist due to the complexity of software systems including the rapid changes and complexity of getting thorough coverage for complex scenarios in pre-production.

BRIEF DESCRIPTION OF THE DRAWINGS

A better understanding of the present invention can be obtained from the following detailed description in conjunction with the following drawings, in which:

FIGS. 2A-C are block diagrams illustrating an exemplary VEX instruction format according to embodiments of the invention;

FIG. 3 is a block diagram of a register architecture according to one embodiment of the invention.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Processor Architectures, Instruction Formats, and Data Types

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 1A:
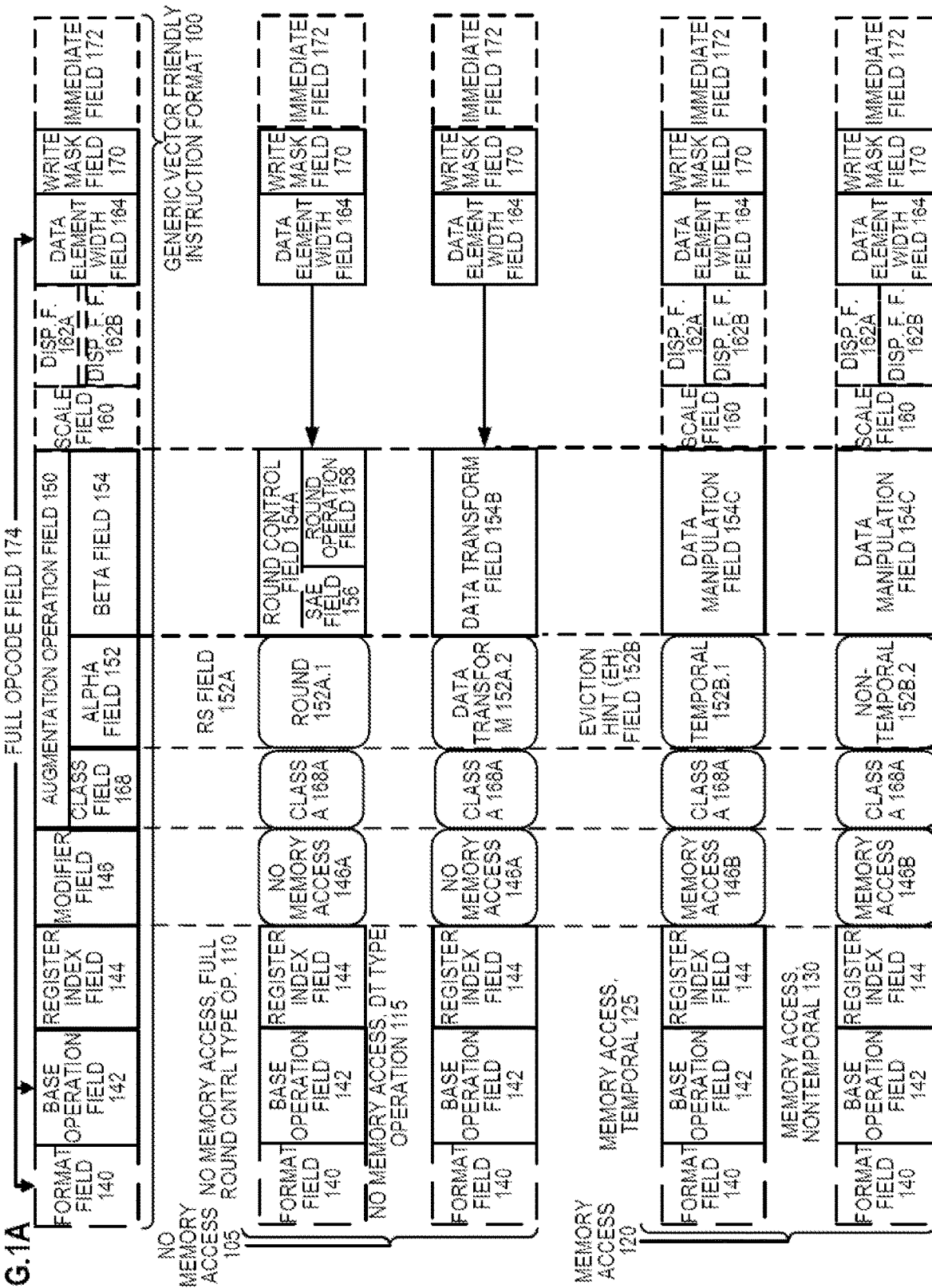
FIGS. 1A and 1B are block diagrams illustrating a generic vector friendly instruction format and instruction templates thereof according to embodiments of the invention.
Figure 1B:
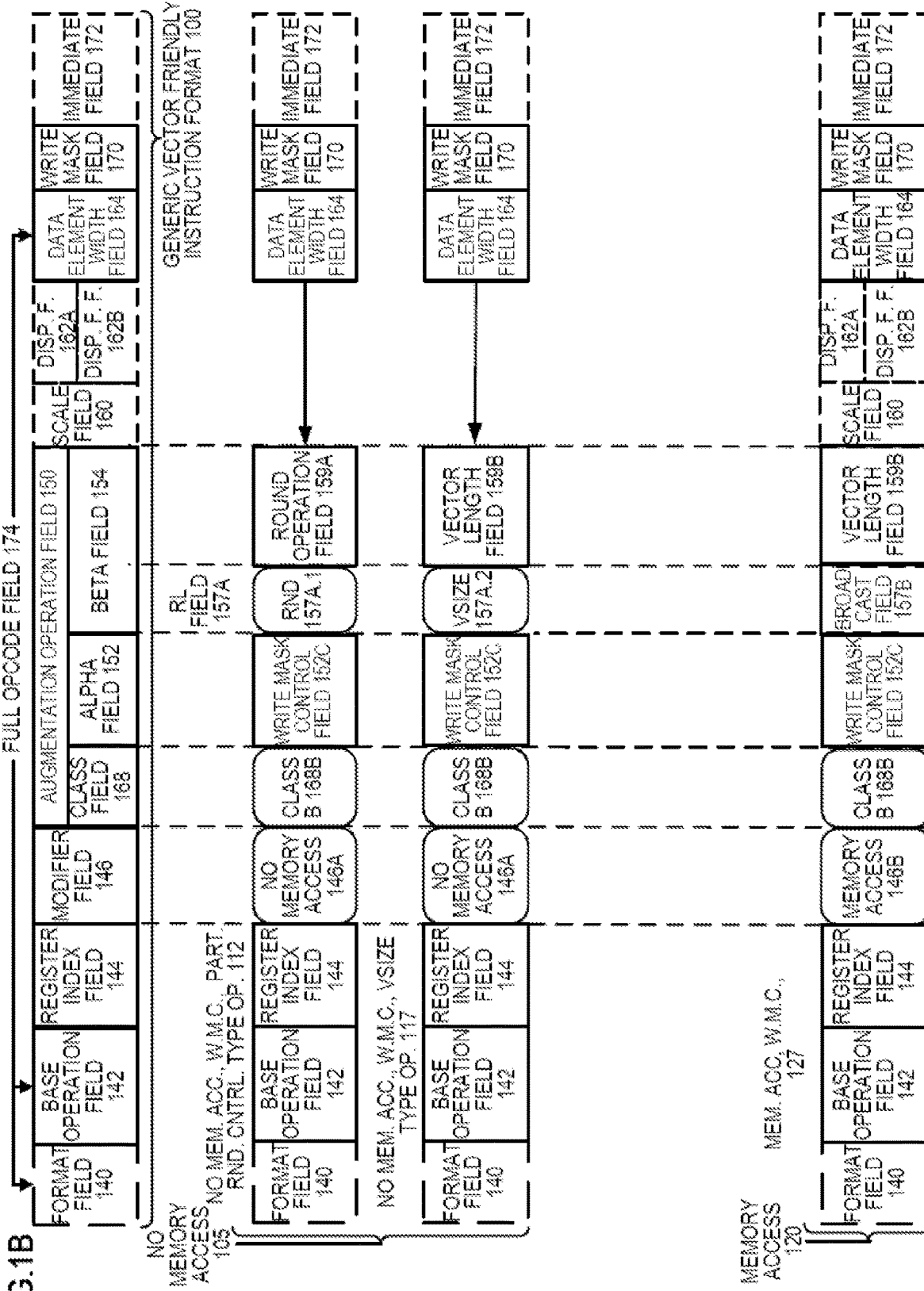

FIGS. 1A-1B are block diagrams illustrating a generic vector friendly instruction format and instruction templates thereof according to embodiments of the invention. FIG. 1A is a block diagram illustrating a generic vector friendly instruction format and class A instruction templates thereof according to embodiments of the invention; while FIG. 1B is a block diagram illustrating the generic vector friendly instruction format and class B instruction templates thereof according to embodiments of the invention. Specifically, a generic vector friendly instruction format 100 for which are defined class A and class B instruction templates, both of which include no memory access 105 instruction templates and memory access 120 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 1A include: 1) within the no memory access 105 instruction templates there is shown a no memory access, full round control type operation 110 instruction template and a no memory access, data transform type operation 115 instruction template; and 2) within the memory access 120 instruction templates there is shown a memory access, temporal 125 instruction template and a memory access, non-temporal 130 instruction template. The class B instruction templates in FIG. 1B include: 1) within the no memory access 105 instruction templates there is shown a no memory access, write mask control, partial round control type operation 112 instruction template and a no memory access, write mask control, vsize type operation 117 instruction template; and 2) within the memory access 120 instruction templates there is shown a memory access, write mask control 127 instruction template.

The generic vector friendly instruction format 100 includes the following fields listed below in the order illustrated in FIGS. 1A-1B.

Format field 140—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 142—its content distinguishes different base operations.

Register index field 144—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 146—its content distinguishes occurrences of instructions in the generic vector instruction format that specify memory access from those that do not; that is, between no memory access 105 instruction templates and memory access 120 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 150—its content distinguishes which one of a variety of different operations to be performed in addition to the base operation. This field is context specific. In one embodiment of the invention, this field is divided into a class field 168, an alpha field 152, and a beta field 154. The augmentation operation field 150 allows common groups of operations to be performed in a single instruction rather than 2, 3, or 4 instructions.

Scale field 160—its content allows for the scaling of the index field's content for memory address generation (e.g., for address generation that uses $2^{scale}*$index+base).

Displacement Field 162A—its content is used as part of memory address generation (e.g., for address generation that uses $2^{scale}*$index+base+displacement).

Displacement Factor Field 162B (note that the juxtaposition of displacement field 162A directly over displacement factor field 162B indicates one or the other is used)—its content is used as part of address generation; it specifies a displacement factor that is to be scaled by the size of a memory access (N)—where N is the number of bytes in the memory access (e.g., for address generation that uses $2^{scale}*$index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 174 (described later herein) and the data manipulation field 154C. The displacement field 162A and the displacement factor field 162B are optional in the sense that they are not used for the no memory access 105 instruction templates and/or different embodiments may implement only one or none of the two.

Data element width field 164—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 170—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 170 allows for partial vector operations, including loads, stores, arithmetic, logical, etc. While embodiments of the invention are described in which the write mask field's 170 content selects one of a number of write mask registers that contains the write mask to be used (and thus the write mask field's 170 content indirectly identifies that masking to be performed), alternative embodiments instead or additional allow the mask write field's 170 content to directly specify the masking to be performed.

Immediate field 172—its content allows for the specification of an immediate. This field is optional in the sense that is it not present in an implementation of the generic vector friendly format that does not support immediate and it is not present in instructions that do not use an immediate.

Class field 168—its content distinguishes between different classes of instructions. With reference to FIGS. 1A-B, the contents of this field select between class A and class B instructions. In FIGS. 1A-B, rounded corner squares are used to indicate a specific value is present in a field (e.g., class A 168A and class B 168B for the class field 168 respectively in FIGS. 1A-B).

Instruction Templates of Class A

In the case of the non-memory access 105 instruction templates of class A, the alpha field 152 is interpreted as an RS field 152A, whose content distinguishes which one of the different augmentation operation types are to be performed (e.g., round 152A.1 and data transform 152A.2 are respectively specified for the no memory access, round type operation 110 and the no memory access, data transform type operation 115 instruction templates), while the beta field 154 distinguishes which of the operations of the specified type is to be performed. In the no memory access 105 instruction templates, the scale field 160, the displacement field 162A, and the displacement scale filed 162B are not present.

No-Memory Access Instruction Templates—Full Round Control Type Operation

In the no memory access full round control type operation 110 instruction template, the beta field 154 is interpreted as a round control field 154A, whose content(s) provide static rounding. While in the described embodiments of the invention the round control field 154A includes a suppress all floating point exceptions (SAE) field 156 and a round operation control field 158, alternative embodiments may support may encode both these concepts into the same field or only have one or the other of these concepts/fields (e.g., may have only the round operation control field 158).

SAE field 156—its content distinguishes whether or not to disable the exception event reporting; when the SAE field's 156 content indicates suppression is enabled, a given instruction does not report any kind of floating-point exception flag and does not raise any floating point exception handler.

Round operation control field 158—its content distinguishes which one of a group of rounding operations to perform (e.g., Round-up, Round-down, Round-towards-zero and Round-to-nearest). Thus, the round operation control field 158 allows for the changing of the rounding mode on a per instruction basis. In one embodiment of the invention where a processor includes a control register for specifying rounding modes, the round operation control field's 150 content overrides that register value.

No Memory Access Instruction Templates—Data Transform Type Operation

In the no memory access data transform type operation 115 instruction template, the beta field 154 is interpreted as a data transform field 1546, whose content distinguishes which one of a number of data transforms is to be performed (e.g., no data transform, swizzle, broadcast).

In the case of a memory access 120 instruction template of class A, the alpha field 152 is interpreted as an eviction hint field 1526, whose content distinguishes which one of the eviction hints is to be used (in FIG. 1A, temporal 152B.1 and non-temporal 152B.2 are respectively specified for the memory access, temporal 125 instruction template and the memory access, non-temporal 130 instruction template), while the beta field 154 is interpreted as a data manipulation field 154C, whose content distinguishes which one of a number of data manipulation operations (also known as primitives) is to be performed (e.g., no manipulation; broadcast; up conversion of a source; and down conversion of a destination). The memory access 120 instruction templates include the scale field 160, and optionally the displacement field 162A or the displacement scale field 162B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 152 is interpreted as a write mask control (Z) field 152C, whose content distinguishes whether the write masking controlled by the write mask field 170 should be a merging or a zeroing.

In the case of the non-memory access 105 instruction templates of class B, part of the beta field 154 is interpreted as an RL field 157A, whose content distinguishes which one of the different augmentation operation types are to be performed (e.g., round 157A.1 and vector length (VSIZE) 157A.2 are respectively specified for the no memory access, write mask control, partial round control type operation 112 instruction template and the no memory access, write mask control, VSIZE type operation 117 instruction template), while the rest of the beta field 154 distinguishes which of the operations of the specified type is to be performed. In the no memory access 105 instruction templates, the scale field 160, the displacement field 162A, and the displacement scale filed 162B are not present.

In the no memory access, write mask control, partial round control type operation 110 instruction template, the rest of the beta field 154 is interpreted as a round operation field 159A and exception event reporting is disabled (a given instruction does not report any kind of floating-point exception flag and does not raise any floating point exception handler).

Round operation control field 159A—just as round operation control field 158, its content distinguishes which one of a group of rounding operations to perform (e.g., Round-up, Round-down, Round-towards-zero and Round-to-nearest). Thus, the round operation control field 159A allows for the changing of the rounding mode on a per instruction basis. In one embodiment of the invention where a processor includes a control register for specifying rounding modes, the round operation control field's 150 content overrides that register value.

In the no memory access, write mask control, VSIZE type operation 117 instruction template, the rest of the beta field 154 is interpreted as a vector length field 159B, whose content distinguishes which one of a number of data vector lengths is to be performed on (e.g., 128, 256, or 512 byte).

In the case of a memory access 120 instruction template of class B, part of the beta field 154 is interpreted as a broadcast field 157B, whose content distinguishes whether or not the broadcast type data manipulation operation is to be performed, while the rest of the beta field 154 is interpreted the vector length field 159B. The memory access 120 instruction templates include the scale field 160, and optionally the displacement field 162A or the displacement scale field 162B.

With regard to the generic vector friendly instruction format 100, a full opcode field 174 is shown including the format field 140, the base operation field 142, and the data element width field 164. While one embodiment is shown where the full opcode field 174 includes all of these fields, the full opcode field 174 includes less than all of these fields in embodiments that do not support all of them. The full opcode field 174 provides the operation code (opcode).

The augmentation operation field 150, the data element width field 164, and the write mask field 170 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

VEX Instruction Format

VEX encoding allows instructions to have more than two operands, and allows SIMD vector registers to be longer than 28 bits. The use of a VEX prefix provides for three-operand (or more) syntax. For example, previous two-operand instructions performed operations such as A=A+B, which overwrites a source operand. The use of a VEX prefix enables operands to perform nondestructive operations such as A=B+C.

FIG. 2A illustrates an exemplary AVX instruction format including a VEX prefix 202, real opcode field 230, Mod R/M byte 240, SIB byte 250, displacement field 262, and IMM8 272. FIG. 2B illustrates which fields from FIG. 2A make up a full opcode field 274 and a base operation field 241. FIG. 2C illustrates which fields from FIG. 2A make up a register index field 244.

VEX Prefix (Bytes 0-2) 202 is encoded in a three-byte form. The first byte is the Format Field 290 (VEX Byte 0, bits [7:0]), which contains an explicit C4 byte value (the unique value used for distinguishing the C4 instruction format). The second-third bytes (VEX Bytes 1-2) include a number of bit fields providing specific capability. Specifically, REX field 205 (VEX Byte 1, bits [7-5]) consists of a VEX.R bit field (VEX Byte 1, bit [7]-R), VEX.X bit field (VEX byte 1, bit [6]-X), and VEX.B bit field (VEX byte 1, bit[5]-B). Other fields of the instructions encode the lower three bits of the register indexes as is known in the art (rrr, xxx, and bbb), so that Rrrr, Xxxx, and Bbbb may be formed by adding VEX.R, VEX.X, and VEX.B. Opcode map field 215 (VEX byte 1, bits [4:0]-mmmmm) includes content to encode an implied leading opcode byte. W Field 264 (VEX byte 2, bit [7]-W)—is represented by the notation VEX.W, and provides different functions depending on the instruction. The role of VEX.vvvv 220 (VEX Byte 2, bits [6:3]-vvvv) may include the following: 1) VEX.vvvv encodes the first source register operand, specified in inverted (1s complement) form and is valid for instructions with 2 or more source operands; 2) VEX.vvvv encodes the destination register operand, specified in 1s complement form for certain vector shifts; or 3) VEX.vvvv does not encode any operand, the field is reserved and should contain 1111b. If VEX.L 268 Size field (VEX byte 2, bit [2]-L)=0, it indicates 28 bit vector; if VEX.L=1, it indicates 256 bit vector. Prefix encoding field 225 (VEX byte 2, bits [1:0]-pp) provides additional bits for the base operation field 241.

Real Opcode Field 230 (Byte 3) is also known as the opcode byte. Part of the opcode is specified in this field.

MOD R/M Field 240 (Byte 4) includes MOD field 242 (bits [7-6]), Reg field 244 (bits [5-3]), and R/M field 246 (bits [2-0]). The role of Reg field 244 may include the following: encoding either the destination register operand or a source register operand (the rrr of Rrrr), or be treated as an opcode extension and not used to encode any instruction operand. The role of R/M field 246 may include the following: encoding the instruction operand that references a memory address, or encoding either the destination register operand or a source register operand.

Scale, Index, Base (SIB)—The content of Scale field 250 (Byte 5) includes SS252 (bits [7-6]), which is used for memory address generation. The contents of SIB.xxx 254 (bits [5-3]) and SIB.bbb 256 (bits [2-0]) have been previously referred to with regard to the register indexes Xxxx and Bbbb.

The Displacement Field 262 and the immediate field (IMM8) 272 contain data.

Exemplary Register Architecture

FIG. 3 is a block diagram of a register architecture 300 according to one embodiment of the invention. In the embodiment illustrated, there are 32 vector registers 310 that are 512 bits wide; these registers are referenced as zmm0 through zmm31. The lower order 256 bits of the lower 6 zmm registers are overlaid on registers ymm0-15. The lower order 128 bits of the lower 6 zmm registers (the lower order 128 bits of the ymm registers) are overlaid on registers xmm0-15.

General-purpose registers 325—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 345, on which is aliased the MMX packed integer flat register file 350—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures. Detailed herein are circuits (units) that comprise exemplary cores, processors, etc.

Exemplary Core Architectures

Figure 4A:
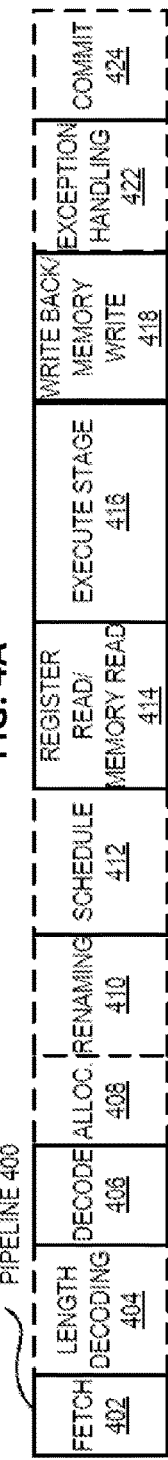
FIG. 4A is a block diagram illustrating both an exemplary in-order fetch, decode, retire pipeline and an exemplary register renaming, out-of-order issue/execution pipeline according to embodiments of the invention.
Figure 4B:
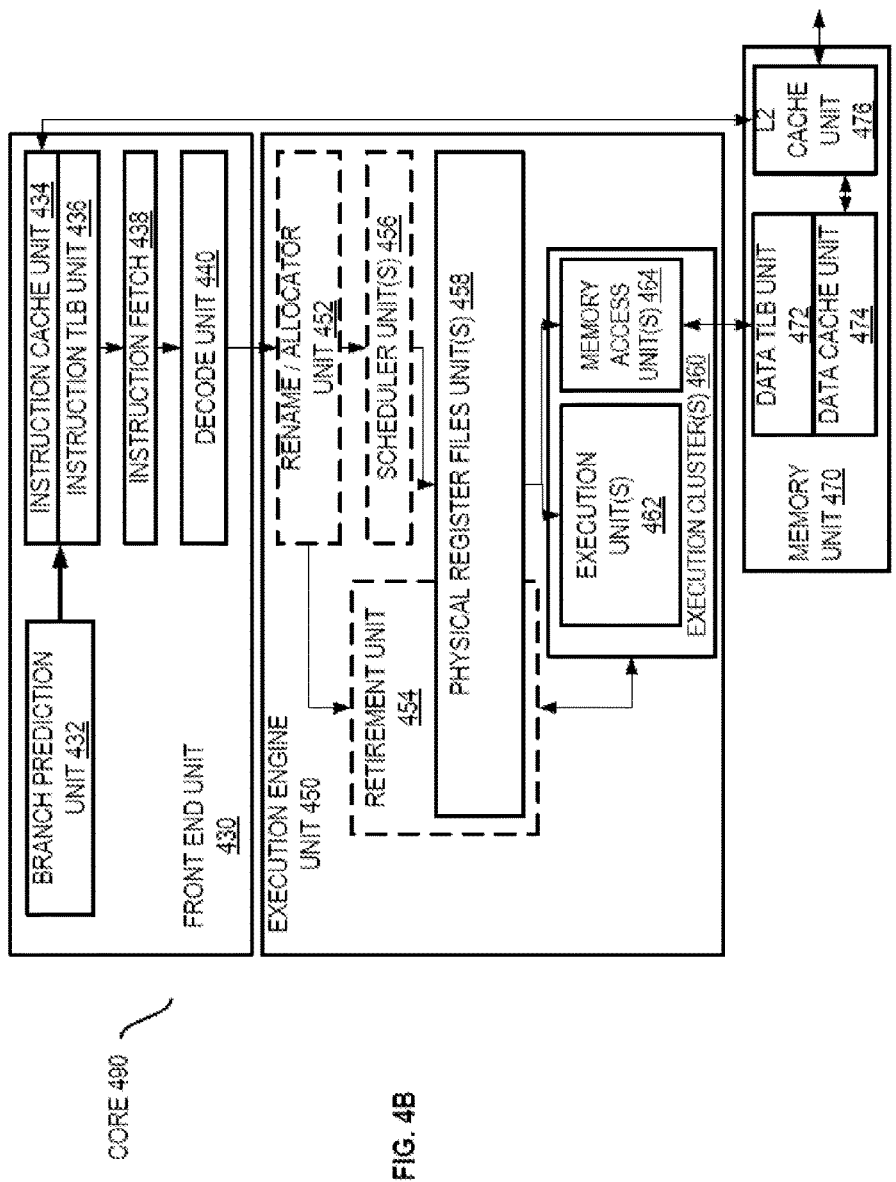
FIG. 4B is a block diagram illustrating both an exemplary embodiment of an in-order fetch, decode, retire core and an exemplary register renaming, out-of-order issue/execution architecture core to be included in a processor according to embodiments of the invention.

FIG. 4A is a block diagram illustrating both an exemplary in-order pipeline and an exemplary register renaming, out-of-order issue/execution pipeline according to embodiments of the invention. FIG. 4B is a block diagram illustrating both an exemplary embodiment of an in-order architecture core and an exemplary register renaming, out-of-order issue/execution architecture core to be included in a processor according to embodiments of the invention. The solid lined boxes in FIGS. 4A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 4A, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

FIG. 4B shows processor core 490 including a front end unit 430 coupled to an execution engine unit 450, and both are coupled to a memory unit 470. The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, coprocessor core, general purpose computing graphics processing unit (GPGPU) core, graphics core, or the like.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit 440 (or decoder) may decode instructions, and generate as an output one or more micro-operations, micro-code entry points, microinstructions, other instructions, or other control signals, which are decoded from, or which otherwise reflect, or are derived from, the original instructions. The decode unit 440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 490 includes a microcode ROM or other medium that stores microcode for certain macroinstructions (e.g., in decode unit 440 or otherwise within the front end unit 430). The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 458 comprises a vector registers unit and a scalar registers unit. These register units may provide architectural vector registers, vector mask registers, and general purpose registers. The physical register file(s) unit(s) 458 is overlapped by the retirement unit 454 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 454 and the physical register file(s) unit(s) 458 are coupled to the execution cluster(s) 460. The execution cluster(s) 460 includes a set of one or more execution units 462 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The instruction cache unit 434 is further coupled to a level 2 (L2) cache unit 476 in the memory unit 470. The L2 cache unit 476 is coupled to one or more other levels of cache and eventually to a main memory.

By way of example, the exemplary register renaming, out-of-order issue/execution core architecture may implement the pipeline 400 as follows: 1) the instruction fetch 438 performs the fetch and length decoding stages 402 and 404; 2) the decode unit 440 performs the decode stage 406; 3) the rename/allocator unit 452 performs the allocation stage 408 and renaming stage 410; 4) the scheduler unit(s) 456 performs the schedule stage 412; 5) the physical register file(s) unit(s) 458 and the memory unit 470 perform the register read/memory read stage 414; the execution cluster 460 perform the execute stage 416; 6) the memory unit 470 and the physical register file(s) unit(s) 458 perform the write back/memory write stage 418; 7) various units may be involved in the exception handling stage 422; and 8) the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 490 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 5B:
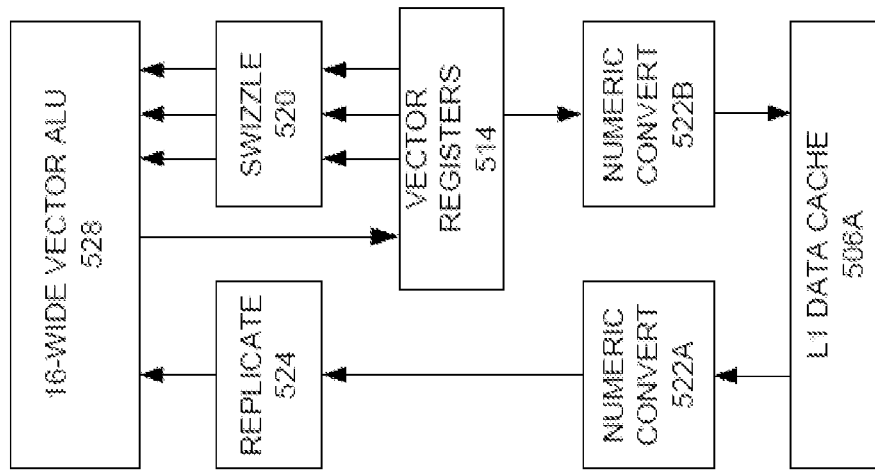
FIG. 5B illustrates an expanded view of part of the processor core in FIG. 5A according to embodiments of the invention.
Figure 5A:
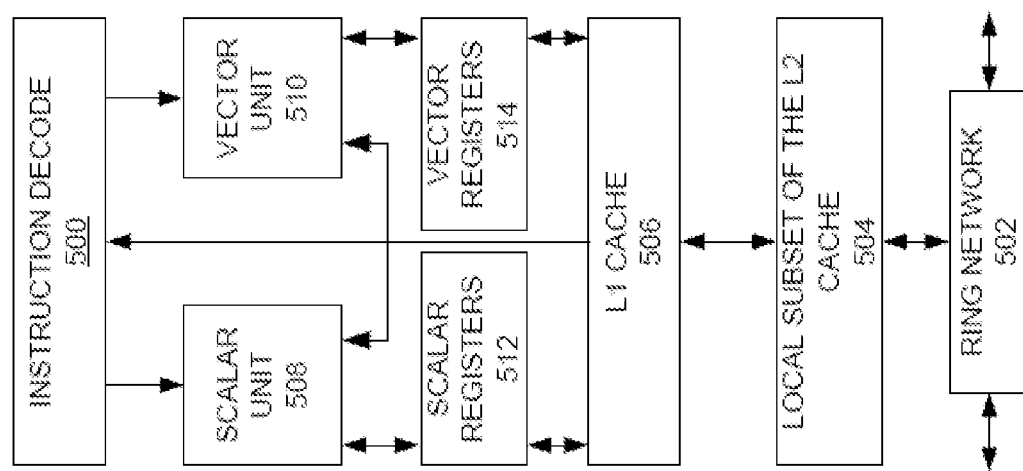
FIG. 5A is a block diagram of a single processor core, along with its connection to an on-die interconnect network.

FIGS. 5A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 5A is a block diagram of a single processor core, along with its connection to the on-die interconnect network 502 and with its local subset of the Level 2 (L2) cache 504, according to embodiments of the invention. In one embodiment, an instruction decoder 500 supports the x86 instruction set with a packed data instruction set extension. An L1 cache 506 allows low-latency accesses to cache memory into the scalar and vector units. While in one embodiment (to simplify the design), a scalar unit 508 and a vector unit 510 use separate register sets (respectively, scalar registers 512 and vector registers 514) and data transferred between them is written to memory and then read back in from a level 1 (L1) cache 506, alternative embodiments of the invention may use a different approach (e.g., use a single register set or include a communication path that allow data to be transferred between the two register files without being written and read back).

The local subset of the L2 cache 504 is part of a global L2 cache that is divided into separate local subsets, one per processor core. Each processor core has a direct access path to its own local subset of the L2 cache 504. Data read by a processor core is stored in its L2 cache subset 504 and can be accessed quickly, in parallel with other processor cores accessing their own local L2 cache subsets. Data written by a processor core is stored in its own L2 cache subset 504 and is flushed from other subsets, if necessary. The ring network ensures coherency for shared data. The ring network is bi-directional to allow agents such as processor cores, L2 caches and other logic blocks to communicate with each other within the chip. Each ring data-path is 1024-bits wide per direction in some embodiments.

FIG. 5B is an expanded view of part of the processor core in FIG. 5A according to embodiments of the invention. FIG. 5B includes an L1 data cache 506A part of the L1 cache 504, as well as more detail regarding the vector unit 510 and the vector registers 514. Specifically, the vector unit 510 is a 6-wide vector processing unit (VPU) (see the 16-wide ALU 528), which executes one or more of integer, single-precision float, and double-precision float instructions. The VPU supports swizzling the register inputs with swizzle unit 520, numeric conversion with numeric convert units 522A-B, and replication with replication unit 524 on the memory input.

Processor with Integrated Memory Controller and Graphics

Figure 6:
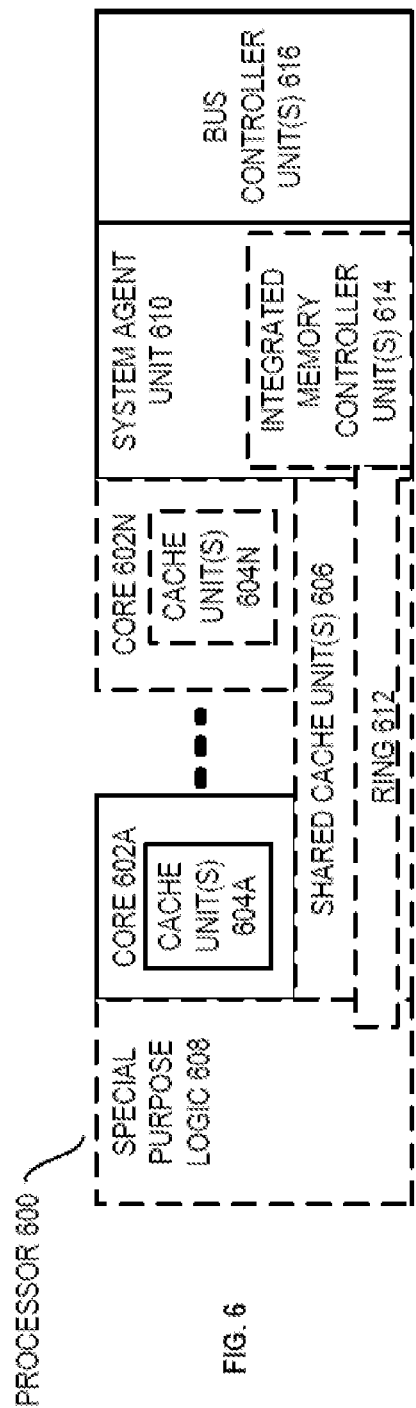
FIG. 6 is a block diagram of a single core processor and a multicore processor with integrated memory controller and graphics according to embodiments of the invention.

FIG. 6 is a block diagram of a processor 600 that may have more than one core, may have an integrated memory controller, and may have integrated graphics according to embodiments of the invention. The solid lined boxes in FIG. 6 illustrate a processor 600 with a single core 602A, a system agent 610, a set of one or more bus controller units 616, while the optional addition of the dashed lined boxes illustrates an alternative processor 600 with multiple cores 602A-N, a set of one or more integrated memory controller unit(s) 614 in the system agent unit 610, and special purpose logic 608.

Thus, different implementations of the processor 600 may include: 1) a CPU with the special purpose logic 608 being integrated graphics and/or scientific (throughput) logic (which may include one or more cores), and the cores 602A-N being one or more general purpose cores (e.g., general purpose in-order cores, general purpose out-of-order cores, a combination of the two); 2) a coprocessor with the cores 602A-N being a large number of special purpose cores intended primarily for graphics and/or scientific (throughput); and 3) a coprocessor with the cores 602A-N being a large number of general purpose in-order cores. Thus, the processor 600 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 600 may be a part of and/or may be implemented on one or more substrates using any of a number of process technologies, such as, for example, BiCMOS, CMOS, or NMOS.

The memory hierarchy includes one or more levels of cache within the cores 604A-N, a set or one or more shared cache units 606, and external memory (not shown) coupled to the set of integrated memory controller units 614. The set of shared cache units 606 may include one or more mid-level caches, such as level 2 (L2), level 3 (L3), level 4 (L4), or other levels of cache, a last level cache (LLC), and/or combinations thereof. While in one embodiment a ring based interconnect unit 612 interconnects the integrated graphics logic 608, the set of shared cache units 606, and the system agent unit 610/integrated memory controller unit(s) 614, alternative embodiments may use any number of well-known techniques for interconnecting such units. In one embodiment, coherency is maintained between one or more cache units 606 and cores 602-A-N.

In some embodiments, one or more of the cores 602A-N are capable of multi-threading. The system agent 610 includes those components coordinating and operating cores 602A-N. The system agent unit 610 may include for example a power control unit (PCU) and a display unit. The PCU may be or include logic and components needed for regulating the power state of the cores 602A-N and the integrated graphics logic 608. The display unit is for driving one or more externally connected displays.

The cores 602A-N may be homogenous or heterogeneous in terms of architecture instruction set; that is, two or more of the cores 602A-N may be capable of execution the same instruction set, while others may be capable of executing only a subset of that instruction set or a different instruction set.

Exemplary Computer Architectures

FIGS. 7-10 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 7:
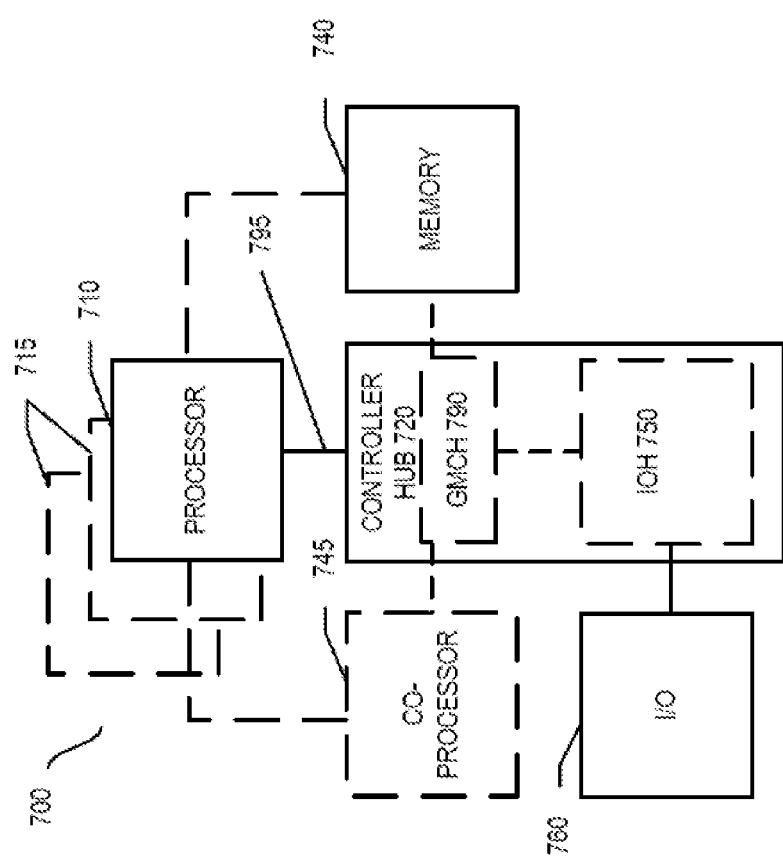
FIG. 7 illustrates a block diagram of a system in accordance with one embodiment of the present invention.

Referring now to FIG. 7, shown is a block diagram of a system 700 in accordance with one embodiment of the present invention. The system 700 may include one or more processors 710, 715, which are coupled to a controller hub 720. In one embodiment, the controller hub 720 includes a graphics memory controller hub (GMCH) 790 and an Input/Output Hub (IOH) 750 (which may be on separate chips); the GMCH 790 includes memory and graphics controllers to which are coupled memory 740 and a coprocessor 745; the IOH 750 is couples input/output (I/O) devices 760 to the GMCH 790. Alternatively, one or both of the memory and graphics controllers are integrated within the processor (as described herein), the memory 740 and the coprocessor 745 are coupled directly to the processor 710, and the controller hub 720 in a single chip with the IOH 750.

The optional nature of additional processors 715 is denoted in FIG. 7 with broken lines. Each processor 710, 715 may include one or more of the processing cores described herein and may be some version of the processor 600.

The memory 740 may be, for example, dynamic random access memory (DRAM), phase change memory (PCM), or a combination of the two. For at least one embodiment, the controller hub 720 communicates with the processor(s) 710, 715 via a multi-drop bus, such as a frontside bus (FSB), point-to-point interface, or similar connection 795.

In one embodiment, the coprocessor 745 is a special-purpose processor, such as, for example, a high-throughput MIC processor, a network or communication processor, compression engine, graphics processor, GPGPU, embedded processor, or the like. In one embodiment, controller hub 720 may include an integrated graphics accelerator.

There can be a variety of differences between the physical resources 710, 7155 in terms of a spectrum of metrics of merit including architectural, microarchitectural, thermal, power consumption characteristics, and the like.

In one embodiment, the processor 710 executes instructions that control data processing operations of a general type. Embedded within the instructions may be coprocessor instructions. The processor 710 recognizes these coprocessor instructions as being of a type that should be executed by the attached coprocessor 745. Accordingly, the processor 710 issues these coprocessor instructions (or control signals representing coprocessor instructions) on a coprocessor bus or other interconnect, to coprocessor 745. Coprocessor(s) 745 accept and execute the received coprocessor instructions.

Figure 8:
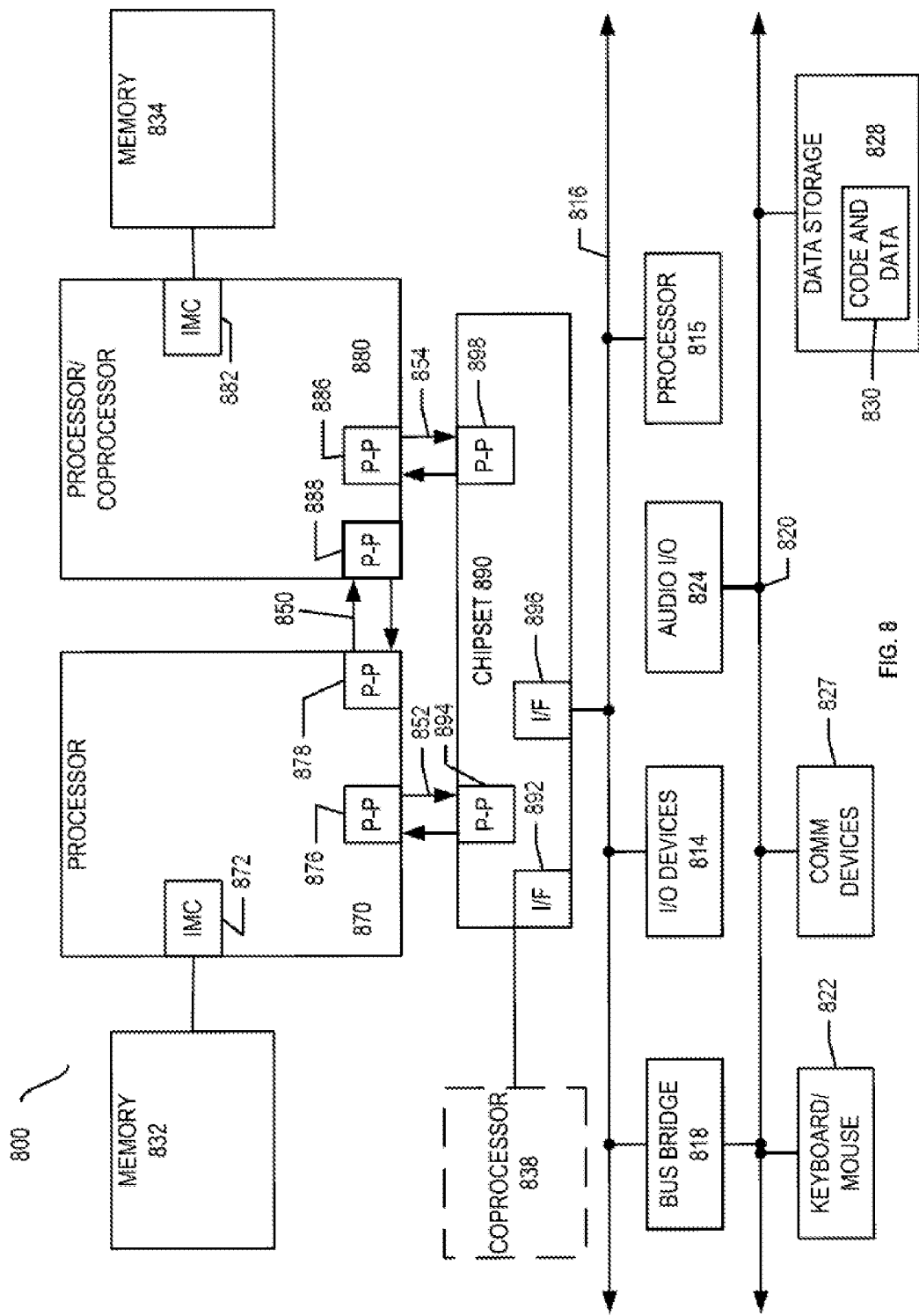
FIG. 8 illustrates a block diagram of a second system in accordance with an embodiment of the present invention.

Referring now to FIG. 8, shown is a block diagram of a first more specific exemplary system 800 in accordance with an embodiment of the present invention. As shown in FIG. 8, multiprocessor system 800 is a point-to-point interconnect system, and includes a first processor 870 and a second processor 880 coupled via a point-to-point interconnect 850. Each of processors 870 and 880 may be some version of the processor 600. In one embodiment of the invention, processors 870 and 880 are respectively processors 710 and 715, while coprocessor 838 is coprocessor 745. In another embodiment, processors 870 and 880 are respectively processor 710 coprocessor 745.

Processors 870 and 880 are shown including integrated memory controller (IMC) units 872 and 882, respectively. Processor 870 also includes as part of its bus controller units point-to-point (P-P) interfaces 876 and 878; similarly, second processor 880 includes P-P interfaces 886 and 888. Processors 870, 880 may exchange information via a point-to-point (P-P) interface 850 using P-P interface circuits 878, 888. As shown in FIG. 8, IMCs 872 and 882 couple the processors to respective memories, namely a memory 832 and a memory 834, which may be portions of main memory locally attached to the respective processors.

Processors 870, 880 may each exchange information with a chipset 890 via individual P-P interfaces 852, 854 using point to point interface circuits 876, 894, 886, 898. Chipset 890 may optionally exchange information with the coprocessor 838 via a high-performance interface 892. In one embodiment, the coprocessor 838 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another I/O interconnect bus, although the scope of the present invention is not so limited.

As shown in FIG. 8, various I/O devices 814 may be coupled to first bus 816, along with a bus bridge 818 which couples first bus 816 to a second bus 820. In one embodiment, one or more additional processor(s) 815, such as coprocessors, high-throughput MIC processors, GPGPU's, accelerators (such as, e.g., graphics accelerators or digital signal processing (DSP) units), field programmable gate arrays, or any other processor, are coupled to first bus 816. In one embodiment, second bus 820 may be a low pin count (LPC) bus. Various devices may be coupled to a second bus 820 including, for example, a keyboard and/or mouse 822, communication devices 827 and a storage unit 828 such as a disk drive or other mass storage device which may include instructions/code and data 830, in one embodiment. Further, an audio I/O 824 may be coupled to the second bus 816. Note that other architectures are possible. For example, instead of the point-to-point architecture of FIG. 8, a system may implement a multi-drop bus or other such architecture.

Figure 9:
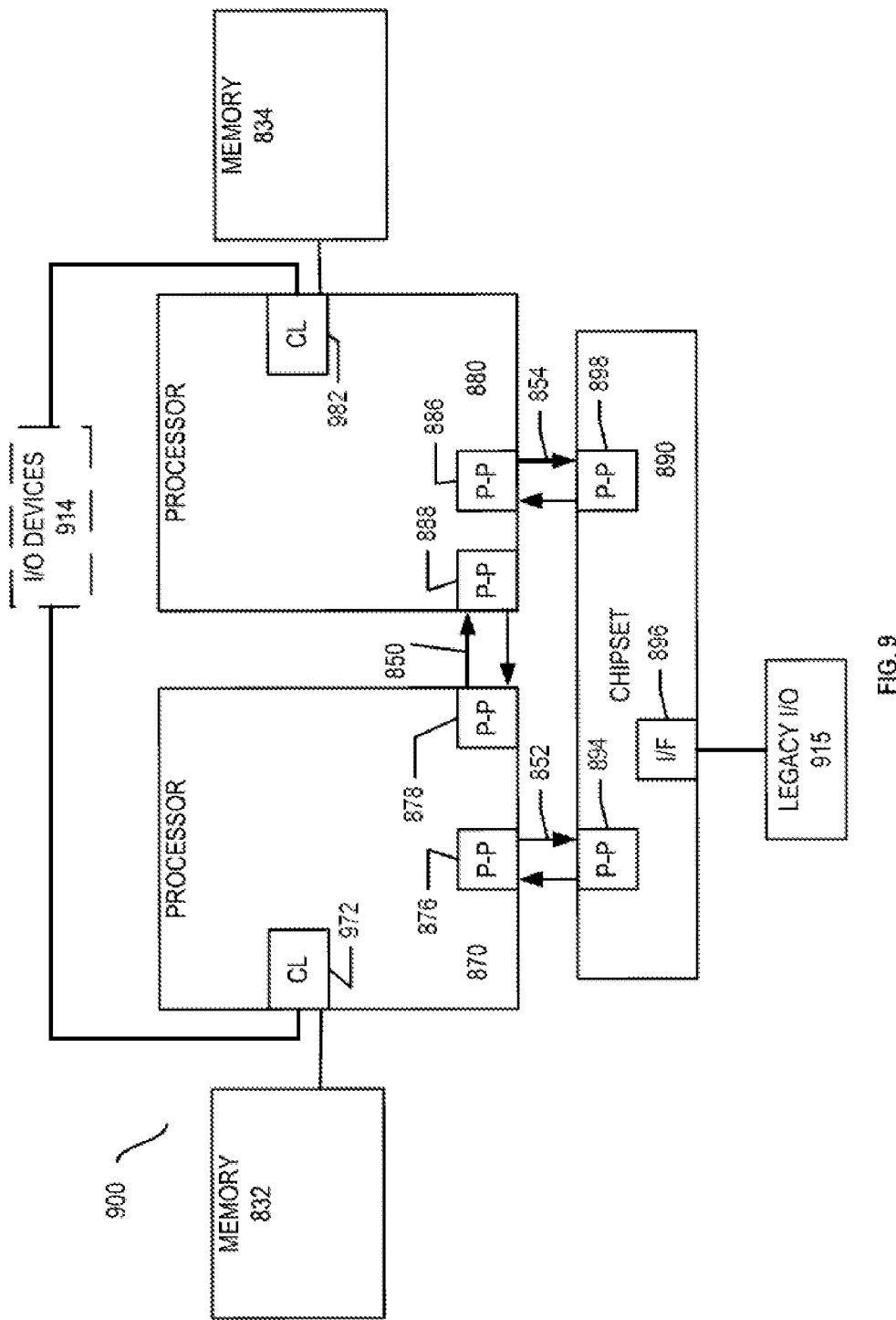
FIG. 9 illustrates a block diagram of a third system in accordance with an embodiment of the present invention.

Referring now to FIG. 9, shown is a block diagram of a second more specific exemplary system 900 in accordance with an embodiment of the present invention. Like elements in FIGS. 8 and 9 bear like reference numerals, and certain aspects of FIG. 8 have been omitted from FIG. 9 in order to avoid obscuring other aspects of FIG. 9.

FIG. 9 illustrates that the processors 870, 880 may include integrated memory and I/O control logic ("CL") 972 and 982, respectively. Thus, the CL 972, 982 include integrated memory controller units and include I/O control logic. FIG. 9 illustrates that not only are the memories 832, 834 coupled to the CL 872, 882, but also that I/O devices 914 are also coupled to the control logic 872, 882. Legacy I/O devices 915 are coupled to the chipset 890.

Figure 10:
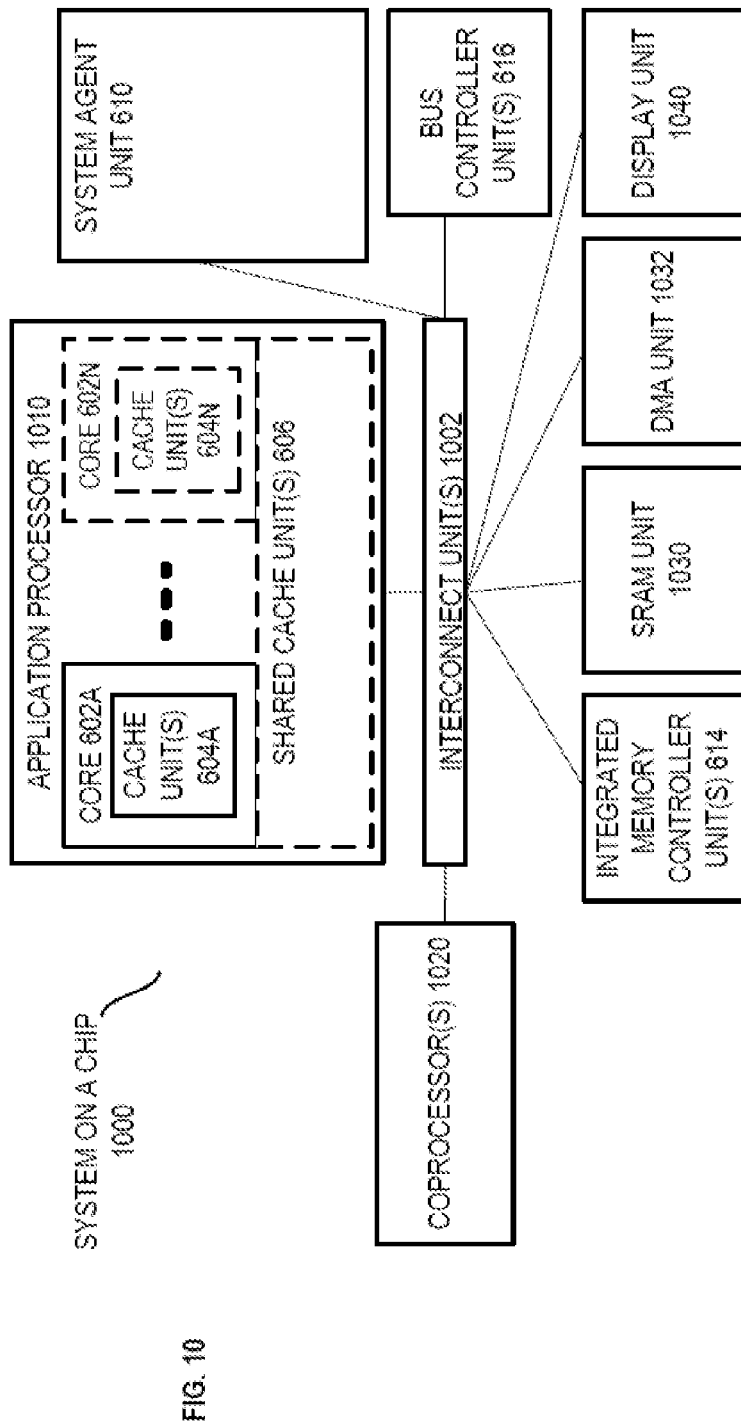
FIG. 10 illustrates a block diagram of a system on a chip (SoC) in accordance with an embodiment of the present invention.

Referring now to FIG. 10, shown is a block diagram of a SoC 1000 in accordance with an embodiment of the present invention. Similar elements in FIG. 6 bear like reference numerals. Also, dashed lined boxes are optional features on more advanced SoCs. In FIG. 10, an interconnect unit(s) 1002 is coupled to: an application processor 1010 which includes a set of one or more cores 102A-N, cache units 604A-N, and shared cache unit(s) 606; a system agent unit 610; a bus controller unit(s) 616; an integrated memory controller unit(s) 614; a set or one or more coprocessors 1020 which may include integrated graphics logic, an image processor, an audio processor, and a video processor; an static random access memory (SRAM) unit 1030; a direct memory access (DMA) unit 1032; and a display unit 1040 for coupling to one or more external displays. In one embodiment, the coprocessor(s) 1020 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 830 illustrated in FIG. 8, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 11:
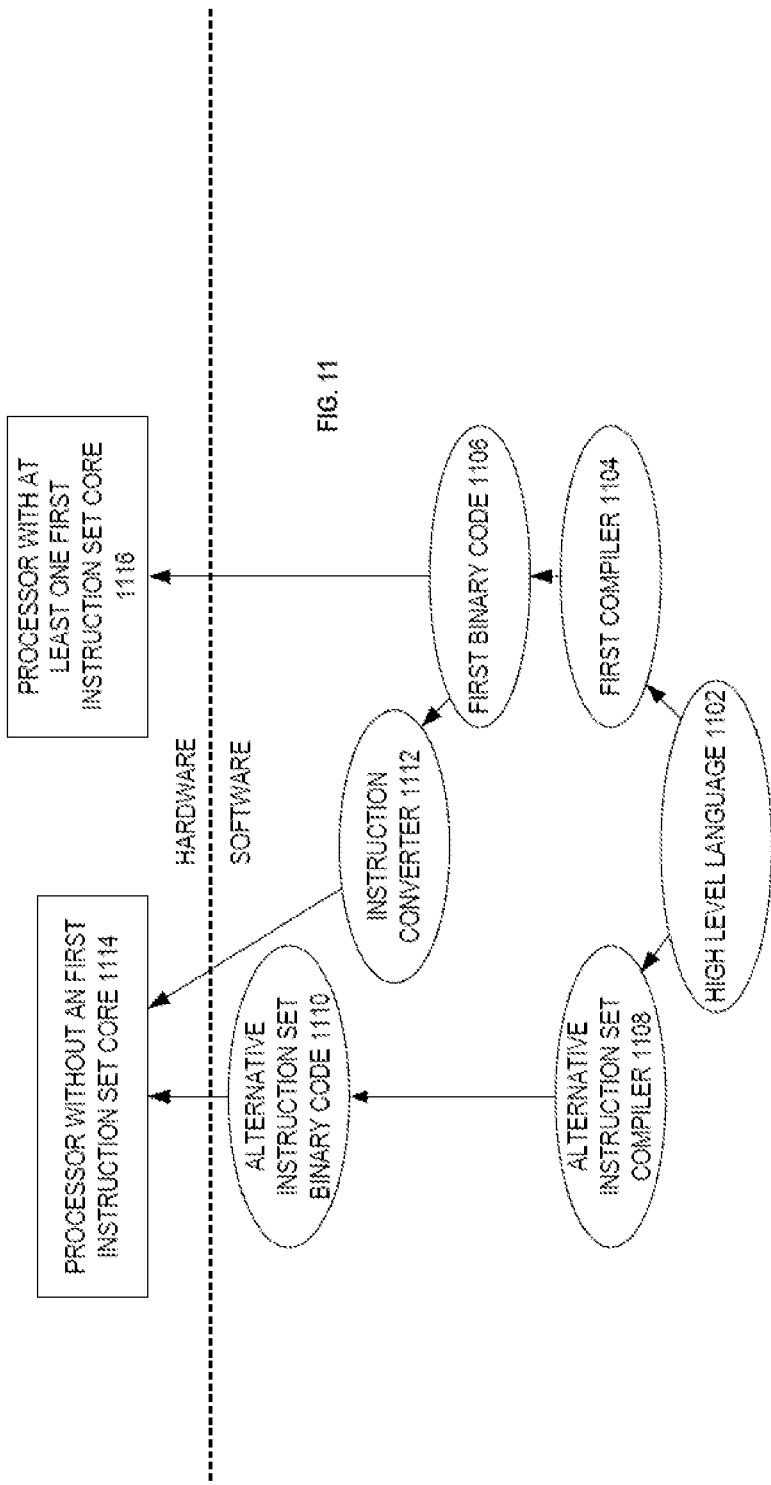
FIG. 11 illustrates a block diagram contrasting the use of a software instruction converter to convert binary instructions in a source instruction set to binary instructions in a target instruction set according to embodiments of the invention.

FIG. 11 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 11 shows a program in a high level language 1102 may be compiled using an first compiler 1104 to generate a first binary code (e.g., x86) 1106 that may be natively executed by a processor with at least one first instruction set core 1116. In some embodiments, the processor with at least one first instruction set core 1116 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The first compiler 1104 represents a compiler that is operable to generate binary code of the first instruction set 1106 (e.g., object code) that can, with or without additional linkage processing, be executed on the processor with at least one first instruction set core 1116. Similarly, FIG. 11 shows the program in the high level language 1102 may be compiled using an alternative instruction set compiler 1108 to generate alternative instruction set binary code 1110 that may be natively executed by a processor without at least one first instruction set core 1114 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1112 is used to convert the first binary code 1106 into code that may be natively executed by the processor without an first instruction set core 1114. This converted code is not likely to be the same as the alternative instruction set binary code 1110 because an instruction converter capable of this is difficult to make; however, the converted code will accomplish the general operation and be made up of instructions from the alternative instruction set. Thus, the instruction converter 1112 represents software, firmware, hardware, or a combination thereof that, through emulation, simulation or any other process, allows a processor or other electronic device that does not have a first instruction set processor or core to execute the first binary code 1106.

Memory Tagging Apparatus and Method

One embodiment of the invention includes a hardware-based memory tagging architecture which achieves significantly greater performance and precision than existing software systems. In one implementation, metadata is attached to linear addresses and stored in a table in linear memory. Metadata is also attached to pointers. The metadata is read from the table and used to generate fast, precise store mismatch exceptions, when it mismatches the metadata attached to the pointer used for referencing the memory. Multiple modes are provided to allow user control over the overheads and behavior of the architecture.

The way that metadata can be attached to pointers is, for example by repurposing address bits. One particular embodiment of the invention includes a mode in which some of the address bits in pointers are repurposed into metadata pointers. The number of repurposed bits and their exact position can be flexible or fixed. Moreover, the mode can be controlled using control register bits. Repurposed bits may be ignored or replaced by a known value (e.g. 0) when the pointer is used for accessing memory.

In one implementation, metadata is also attached to memory using a metadata table (or tables). In one specific embodiment, the table or tables are stored in the linear address space, although the underlying principles of the invention are not limited to this arrangement. Regardless of where it is stored, the table can be a multi-level table or a single level table, and can be configured using a defined set of control registers.

In operation, the architecture marks defined regions of memory with metadata and indicates that these regions require metadata matching for security or for other purposes. This can be done using a separate table, registers that define the memory ranges, and/or may be integrated within the page table (e.g. using protection keys or dedicated bits or encodings). In one embodiment, control registers define how matching behaves for the regions of memory which are marked for matching and for regions of memory which are not marked for matching.

In addition, one embodiment of the invention includes a new set of instructions which attach metadata to memory and pointers and which retrieve metadata that is attached to memory or pointers (e.g., for validating a match). Certain instructions may be used to enhance the speed at which metadata is attached to a range of memory. The instructions operate in accordance with the control registers to control the behavior of the architecture.

The embodiments of the invention may be implemented with different page table arrangements and address translation architectures including, but not limited to, those which use 4-level paging and 5-level paging. By way of example, and not limitation, FIG. 12 illustrates an example of a 4-level paging architecture and FIG. 13 illustrates an example of a 5-level paging architecture.

Figure 12:
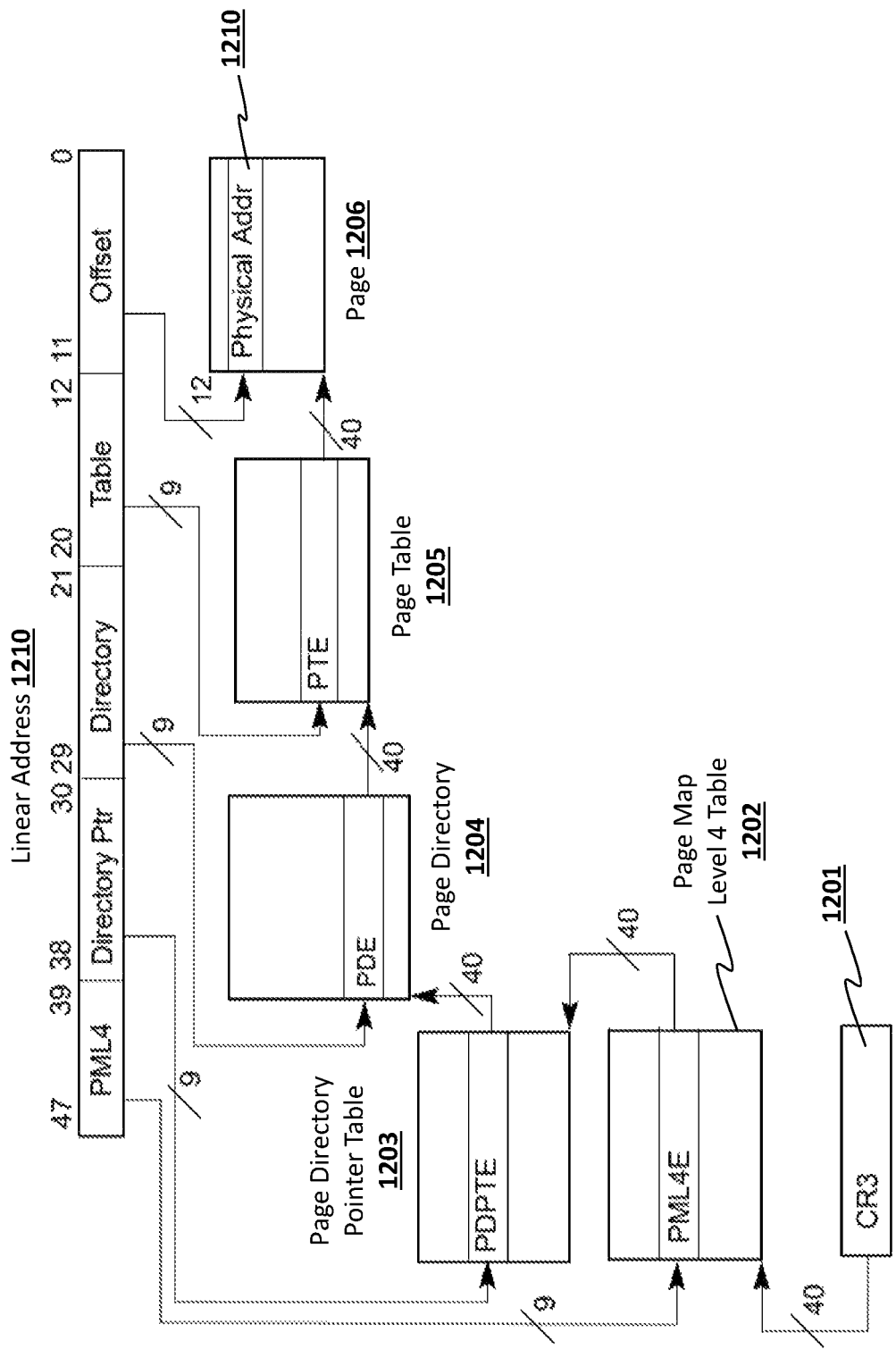
FIGS. 12-13 illustrate two different types of page table lookups.

In FIG. 12, control register CR3 1201 stores the base address of a page map level 4 (PML4) table 1202. The address translation circuitry 1280 uses this value and bits 47:39 of the virtual/linear address 1210 to identify an entry which identifies the base of a page directory pointer table 1203 in which an entry is identified using directory pointer bits 38:30 of the virtual/linear address 1210. The entry from the PDPT 1203 points to the base of a page directory 1204 and directory bits 29:21 from the virtual/linear address 1210 identify a page directory entry (PDE) pointing to the base of a page table 1205. Table bits 20:12 identify a page table entry (PTE) which points to the base of page 1206 and a particular physical address 1210 is identified using offset bits 11:0 from the virtual/linear address 1210.

Access to the final physical page is subject to permission and fault checking mechanisms. If permission checks allow access to the page, then a translation lookaside buffer (TLB) is filled with the virtual to physical mapping so that a subsequent page walk operation is not required.

Figure 13:
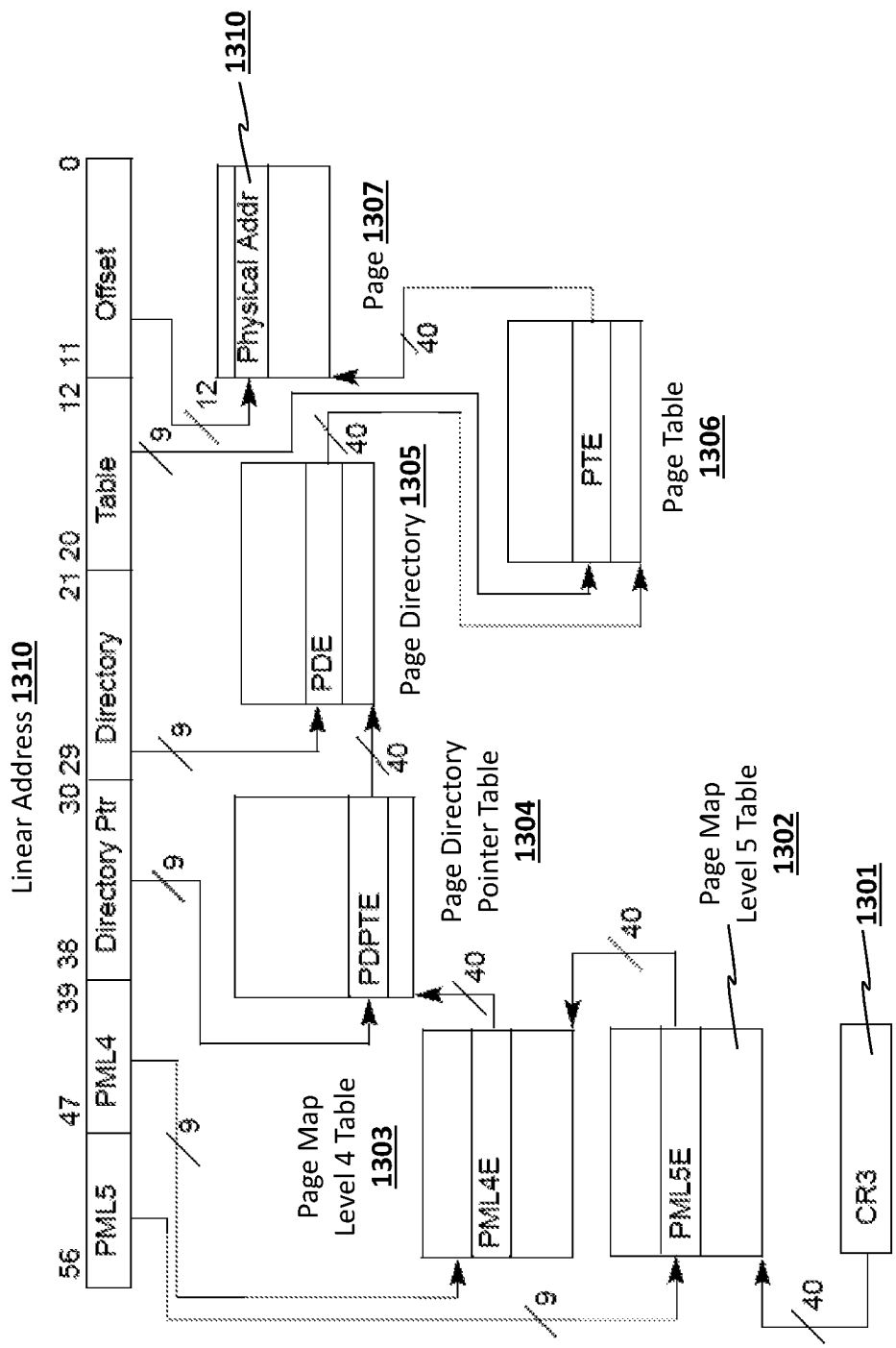

The 5-level paging implementation in FIG. 13 operates in substantially the same manner except that the value in control register CR3 points to a page map level 5 (PML5) table and PML5 bits 56:48 of the virtual/linear address identify a PML5 entry pointing to the base of the PML4 table 1303. The page directory pointer table 1304, page directory 1305, page table 1306, and page 1307 containing the physical address 1310 are accessed in a similar manner as described above.

Figure 14A:
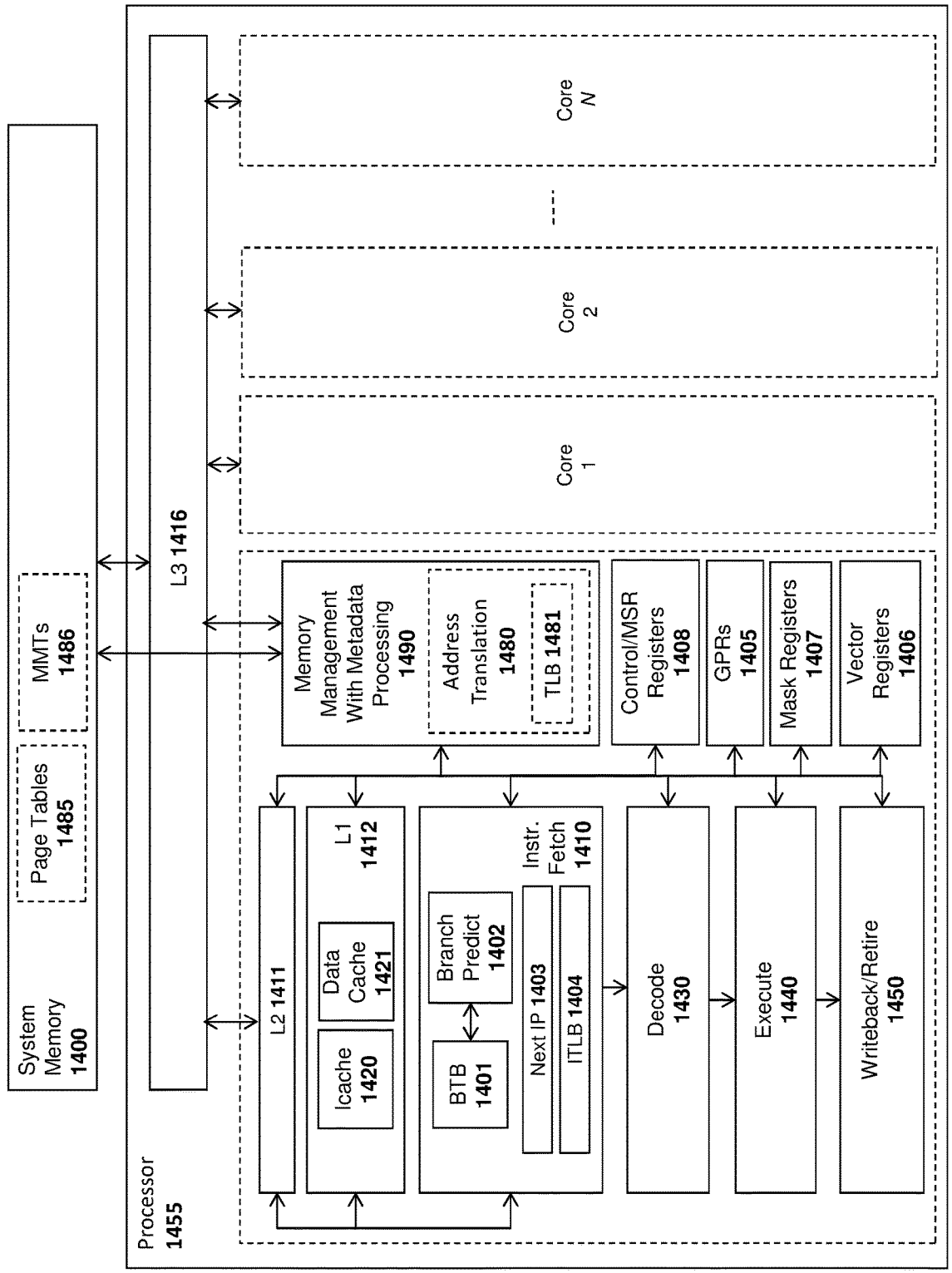
FIGS. 14A-B illustrate embodiments of a processor architecture.

FIG. 14A illustrates an exemplary processor 1455 on which embodiments of the invention may be implemented including a plurality of cores 0-N for simultaneously executing a plurality of instruction threads. While details of only a single core (Core 0) are shown in FIG. 14A, it will be understood that each of the other cores of processor 1455 may include the same or similar components.

The plurality of cores 0-N may each include a memory management unit (MMU) with metadata processing circuitry/logic 1490 for performing memory operations (e.g., such as load/store operations) in combination with the techniques described herein. Address translation circuitry 1480 of the MMU 1490 may implement address translation to access page tables 1485 and corresponding memory metadata tables (MMTs) 1486 in memory 1400 and to validate the associated tags and permissions associated with each translation.

In one embodiment, in response to an address translation request comprising a virtual address, the address translation circuitry 1480 accesses the appropriate set of page table entries 1485 in system memory 1485 to identify the physical memory address associated with the virtual address and to identify corresponding metadata from the MMTs 1486 associated with the virtual address. The address translation circuitry 1480 may also perform permission checking to ensure that the requestor has permission to access the physical memory address. It may then validate the request by comparing the metadata (e.g., a tag value) in the MMT (attached to the memory) with a tag value in the pointer used to reference the memory. If validation fails the operation could fault, using for example a page fault with or without dedicated error indication (page fault error code).

The illustrated architecture also includes an execution pipeline which uses the address translations including an instruction fetch unit 1410 for fetching instructions from system memory 1400, the level 1 (L1) instruction cache 1420, the L2 cache 1411, or the L3 cache 1416. The instruction fetch unit 1410 also includes a next instruction pointer 1403 for storing the address of the next instruction to be fetched from memory 1400 (or one of the caches); an instruction translation look-aside buffer (ITLB) 1404 for storing a map of recently used virtual-to-physical instruction addresses to improve the speed of address translation; a branch prediction unit 1402 for speculatively predicting instruction branch addresses; and branch target buffers (BTBs) 1401 for storing branch addresses and target addresses.

A decoder 1430 decodes the fetched instructions into micro-operations or "uops" and an execution unit 1440 executing the uops on a plurality of functional units. A writeback/retirement unit 1450 retires the executed instructions and writes back the results to other elements of the execution pipeline.

The illustrated core architecture also includes a set of general purpose registers (GPRs) 1405, a set of vector registers 1406, and a set of mask registers 1407. In one embodiment, multiple vector data elements are packed into each vector register 1406 which may have a 512 bit width for storing two 256 bit values, four 128 bit values, eight 64 bit values, sixteen 32 bit values, etc. However, the underlying principles of the invention are not limited to any particular size/type of vector data. In one embodiment, the mask registers 1407 include eight 64-bit operand mask registers used for performing bit masking operations on the values stored in the vector registers 1406 (e.g., implemented as mask registers k0-k7 described herein). However, the underlying principles of the invention are not limited to any particular mask register size/type.

Each core 0-N may include a dedicated Level 1 (L1) cache 1412 and Level 2 (L2) cache 1411 for caching instructions and data according to a specified cache management policy. As mentioned, the L1 cache 1412 includes a separate instruction cache 1420 for storing instructions and a separate data cache 1421 for storing data. The instructions and data stored within the various processor caches are managed at the granularity of cache lines which may be a fixed size (e.g., 64, 128, 512 Bytes in length).

Figure 14B:
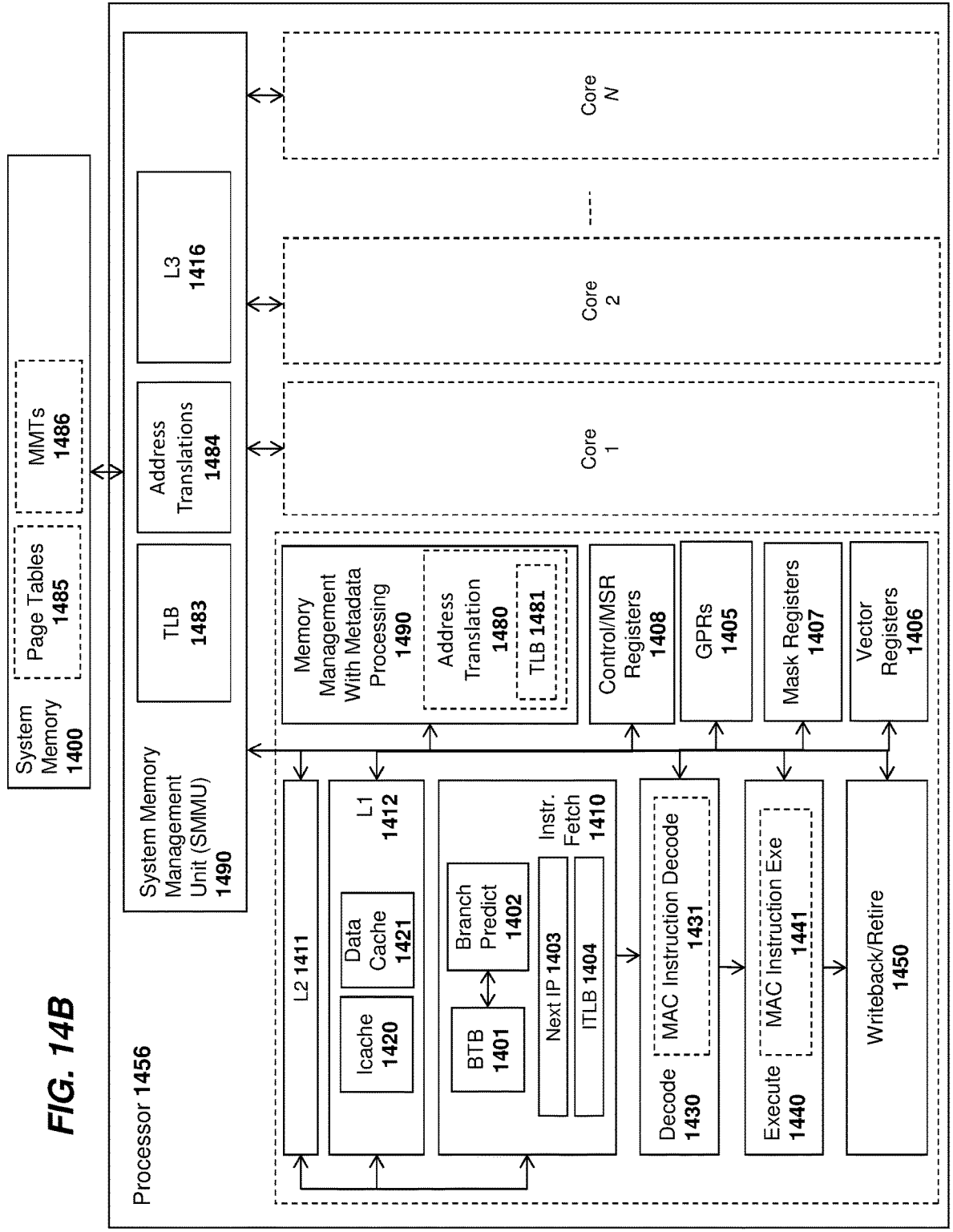

FIG. 14B illustrates an embodiment which includes a system memory management unit (SMMU) 1490 for performing system-level memory management operations on behalf of all of the cores and any other system-level components such as a graphics processor, digital signal processor (DSP), and/or PCIe device. The SMMU 1490 includes an L3 cache 1416, address translation circuitry 1484 for performing virtual-to-physical address translations, and a TLB 1483 for caching the address translations, which may be synchronized with the address translations in the TLBs 1481 of each core. While illustrated within processor 1456, the SMMU may be on a different chip from the processor 1456. The address translation circuitry 1484 of the SMMU 1490 may also perform the metadata-based memory management techniques described herein.

In one embodiment, when memory tagging is enabled for a region of memory, a set of metadata bits are appended to virtual memory address pointers. The metadata bits are stripped off the address pointers (or replaced by a known value) before the memory is accessed or canonical checking is performed. In certain implementations, memory tagging is set for positive addresses and negative addresses independently (positive addresses may be defined as those where linear address (LA) bit 63 (LA[63])=0 and negative addresses are LA[63]=1), so user (positive addresses) and kernel (negative addresses) each has its own settings.

Regardless of the specific implementation, on each memory access to a tagged memory region, metadata-based management operations are performed by the address translation circuitry 1480 to verify a match between the pointer metadata (e.g., the bits appended to the virtual address pointer) and the memory metadata (e.g., bits associated with the memory region in the MMTs 1486). If a match is not found, a fault may be generated.

Figure 15:
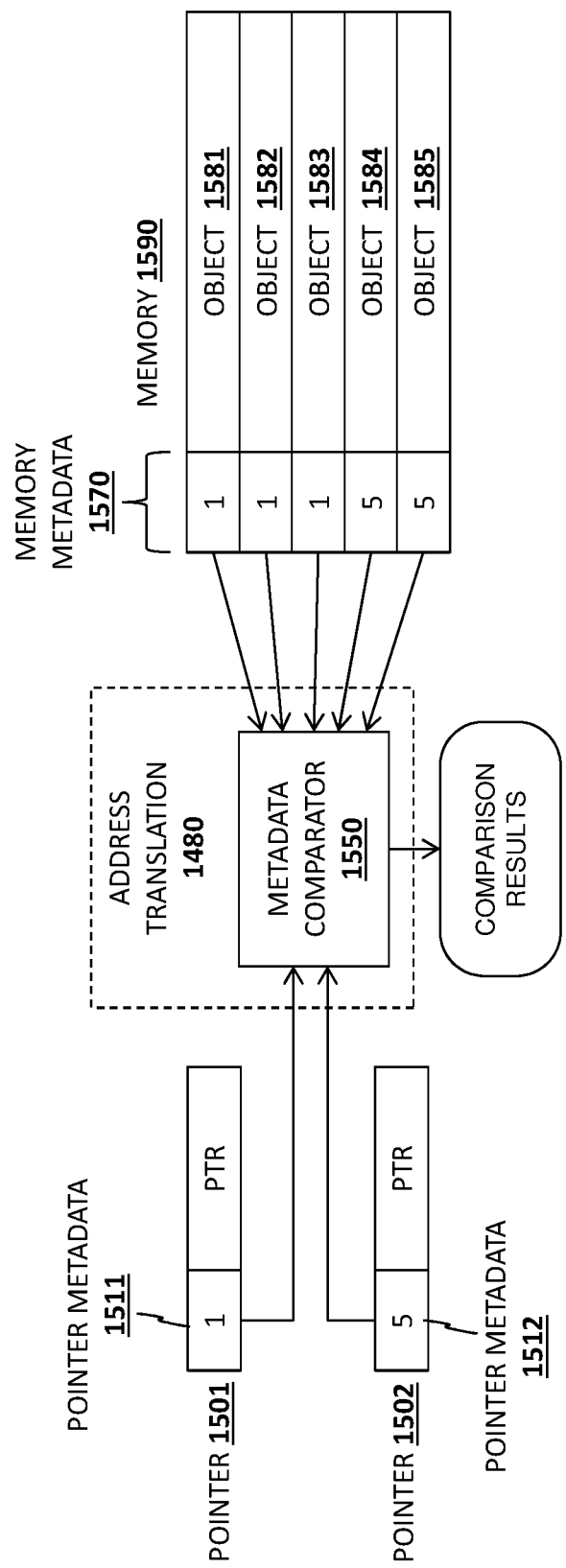
FIG. 15 illustrate examples of pointer metadata and memory metadata in accordance with one embodiment.

FIG. 15 illustrates a specific example in which a metadata comparator 1550 of the address translation circuitry 1480 compares pointer metadata 1511-1512 of two virtual address pointers 1501-1502, respectively, with memory metadata 1570 stored in memory 1590 (e.g., stored in an MU 1486) and associated with memory objects 1581-1585. The address pointer 1501 with a metadata value of 1 may be used to access the first three memory objects 1581-1583 and the address pointer 1502 with a metadata value of 5 may be used to access the last two memory objects 1584-1585 because of matching pointer/memory metadata values (1 and 5 in the example). However, if address pointer 1502 pointed to one of memory objects 1581-1582, or address pointer 1501 pointed to memory objects 1583-1585, the comparator 1550 would generate a fault condition because the metadata values (1 and 5) would not match.

The following is an example implementation with specific parameters, such as bit positions, numbers of bits, block sizes, tables and table arrangements, and memory marking techniques. It should be noted, however, that the underlying principles of the invention are not limited to these specific implementation details.

Figure 16:
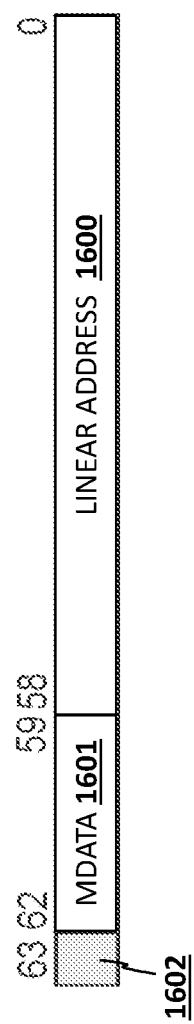
FIG. 16 illustrates how pointer metadata may be appended to an address pointer in one embodiment.

I. Pointer Metadata: As illustrated in FIG. 16, pointer metadata 1601 is attached to linear addresses 1600 using bits 62:59 of the linear address; that is, bits 62:59 are repurposed for use as metadata. In an alternate implementation, the size of the address pointer may be extended to accommodate the additional metadata bits.

Pointer metadata 1601 can be enabled per thread, using control register bits. For example, on an x86 architecture, a bit or bits in CR3 which points to the memory paging structures can store whether metadata is enabled. This can be further split into a bit for the user and a bit for supervisor. The user/supervisor bit can be selected using the most significant bit of the pointer. In FIG. 16, for example, bit 63 1602 is used to distinguish between user and supervisor access. Thus, when bit 63 is 0, the user control register for the user is used, otherwise the supervisor/kernel control register is used. In one embodiment, when the mode is set for protected access, the memory management circuitry 1490 ignores the metadata bits (or replaces them with a known value) when accessing the memory 1400, and uses the metadata bits for protection as described below.

Figure 17:
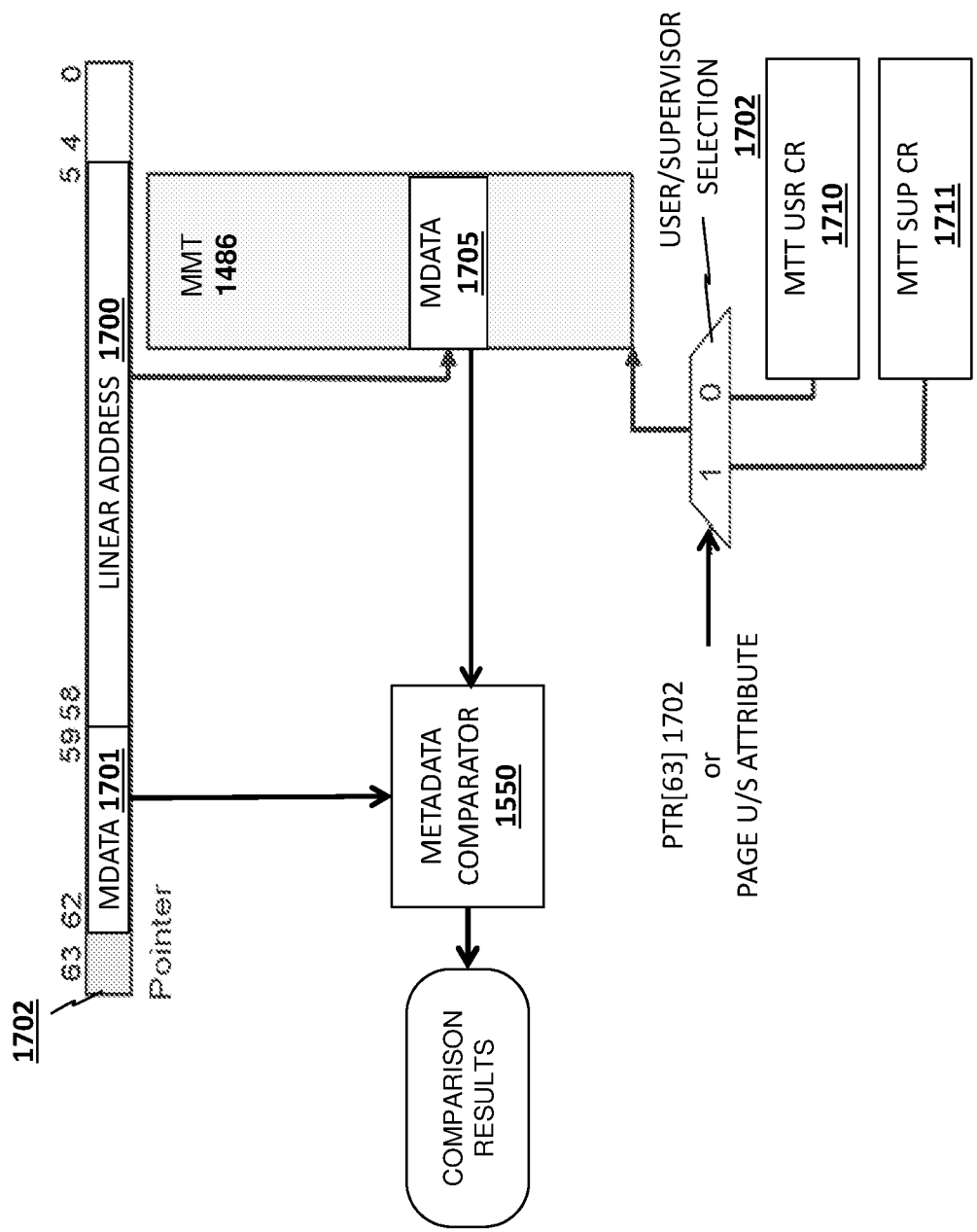
FIG. 17 illustrates one embodiment in which different metadata tables are defined for user and supervisor program code.

II. Memory Metadata: Referring to FIG. 17, in one embodiment, memory metadata 1701 is attached to each block of 16 bytes of linear address space, and is stored in a memory metadata table 1486 in the linear address space. As mentioned, the memory metadata table 1486 may be a flat table, a multi-level table, or may utilize other types of data structures. In the embodiment in FIG. 17, each entry in the memory metadata table 1486 includes 4 bits to store the 4-bit memory metadata. The memory metadata table 1486 may be managed by a set of metadata management instructions executed by the cores.

In one embodiment, the base of the memory metadata table 1486 can be defined either using one control register or using multiple control registers, one for each mode. In FIG. 17, a first control register 1710 points to a first table for user memory, and a second control register 1711 points to a second table for supervisor/kernel memory. User/supervisor selection circuitry 1720 selects between the two registers 1710-1711 based on the user/supervisor bit 1702 of the address pointer (pointer bit 63 value 0 denotes user, value or 1 denotes supervisor), or using the paging user/supervisor attribute. Other techniques for selecting between the two are possible (e.g. using dedicated instructions for user or supervisor accesses). Once the appropriate table is selected, the linear address 1700 is used to identify the entry storing the metadata 1705. In one embodiment, the entry is denoted by the pointer value 1700 divided by the metadata block size (e.g., 16 in the above example).

Once the correct metadata is identified, the metadata comparator 1550 compares the table metadata 1705 with the pointer metadata 1701. If the two values match, then the memory access is validated. If not, then a fault may be generated.

The memory metadata tables (MMT) may include additional information on top of the metadata used for the match. It may include, for example, permissions (read or write permissions) for that block (16 bytes in our example) of memory. It may also include additional metadata such as non-initialized regions within the block. For example, 16 bits can be used to denote which bytes in the 16 bytes were written to. Such information can be used to detect uninitialized memory accesses. Additional metadata types may also be possible to define a "red zone" of bytes that should not be accessed; which is useful for off-by-one access detection to detect accesses over a tail of an object that ends inside the block III. Matching Behavior: In one embodiment, the memory regions which require metadata matching are marked using page table protection keys. This embodiment may take advantage of unused bits from the user and supervisor protection key registers, PKRU and PKRS, respectively. Alternatively, new protection-key-MU-protection registers, PKMPU and PKMPS, may be defined as the MU protection variant for PKRU and PKRS, respectively. If new registers are used, they are added to the application contexts which are saved and restored (e.g., using XSAVE/XSAVES and XRSTOR/XRSTORS). It should be noted that some embodiment may use bits in the PTE to indicate matching behavior (instead or in addition to PKEY bits), or other means to indicate the matching behavior such as register ranges or predefined ranges of memory.

In one embodiment, control registers define how matching is performed for any memory region that is marked for matching and for those memory regions that are not marked for matching. These control registers can be defined separately for user and supervisor (e.g., in the same manner as the MMT table base registers). By way of example, and not limitation, one embodiment of the control register(s) include mode bits for one or more of the following:

Load Check Disable (LCD) to reduce the checking overhead by only checking stores.

Store Check Disable (SCD) to disable store checking overhead. Other disable operations may also be implemented.

Supervisor Mode MTT Check Disable which disables MU checking for loads and stores while in supervisor/kernel mode (e.g., when the current privilege level (CPL) is less than 3).

Limit Non-Protected Memory Accesses (LNPMA) to a specific value or metadata pointers. In this implementation, only pointers with a specific metadata value (e.g., 0 or canonical form) are allowed to access non-protected memory.

As mentioned, any or all of these control settings may be included as part of the context switching operations performed by the cores (e.g., part of XSAVE/XSAVES and XRSTOR/XRSTORS for an x86 implementation).

IV. Metadata Instructions: As mentioned, one embodiment includes a new set of instructions for managing and using metadata as described herein. By way of example, and not limitation, one embodiment of the invention includes the following new instructions:

Read/Write Memory Metadata Instructions:
READTAG $addr, % reg // reg=tag[addr]
This instruction reads the metadata tag attached to the provided memory address. For example, it may read the metadata tag from the memory metadata table 1486 described above.

WRITETAG $addr, % reg // tag[addr]=reg
This instruction attaches a metadata tag value to the provided memory address. For example, it may store the metadata tag in the memory metadata table 1486 described above.

Extract or Embed Address Pointer Tag Instructions:
EXTAG % reg1, % reg2 // reg1=reg2.tag
The EXTAG instruction extracts the metadata tag from a provided address pointer. For example, bits 62:59 may be read from the linear address pointer in FIG. 16.

EMTAG % reg1, % reg2 // reg1=reg1.addr+reg2.tag
The EMTAG instruction embeds a metadata tag into an address pointer. For example, a tag may be embedded in bits 62:59 of the linear address pointer in FIG. 16.

EXADDR % reg1, % reg2 // reg1=reg2.addr

Extract the linear address from an address pointer. For example, bits 58:0 in FIG. 16 may be extracted.

Performance Optimization Instructions:
WRITEFULLTAG $addr, % reg (64-byte cache line tagged with the same value). This instruction attaches a metadata tag value to multiple addresses (e.g., 64 bytes of memory).

REP WRITETAG $addr, % reg // for X blocks: tag[addr+=block_size]=reg

This instruction repeats the WRITETAG instruction based on an implicit register repeat count.

Bypass Checks Instructions
New load store instructions that bypass metadata checking may be implemented, or prefix byte may be used to mark load or store instructions that do not require metadata matching.

Signaling Protection Failure
A signaling protection failure may result from a metadata mismatch.
GP or page fault with the faulting address being the pointer value and a special error code.

As mentioned, in one embodiment, the memory metadata table 1486 is in the linear address space. The physical memory used for the memory metadata is proportional to the protected memory (e.g., 3% using the above example implementation of 4 bits per 16 bytes). The operating system can easily manage this space, and implementing these techniques require minimal changes to the operating system. For example, the virtual memory management and context switching mechanisms do not require alteration. These techniques are also highly scalable as the content and size of the metadata can be easily adjusted.

Memory Tagging Implementations in an Out-of-Order Processor

One embodiment of the invention comprises a memory tagging technology (MU) implementation which has a low impact on the processor or SoC. In particular, this embodiment does not require changes to the processor/SoC silicon outside of the core, in contrast to implementations which would require changes to the "uncore" logic (i.e., circuitry outside of the core) such as coherency protocols and internal/external (multi-socket) memory translation protocols. The embodiments described below also provide an adaptable configuration in which complexity can be traded for performance. These embodiments can be improved after an initial implementation to provide improved performance without changes to the application or the application code, and may not even require.

As described above in detail, MU memory metadata can be attached to each block of N bytes of linear or physical address space memory (see, e.g., FIG. 15 and associated text). The metadata may be stored in extra memory bits such as within the ECC storage in some forms of DRAM, or as extra bits in the memory hierarchy. Alternatively, or in addition, the metadata may be stored in hidden physical memory, meaning memory which is dedicated to metadata storage and not used as regular memory. The metadata can also be stored in a flat or hierarchical table in the linear address (LA) space.

Figure 18:
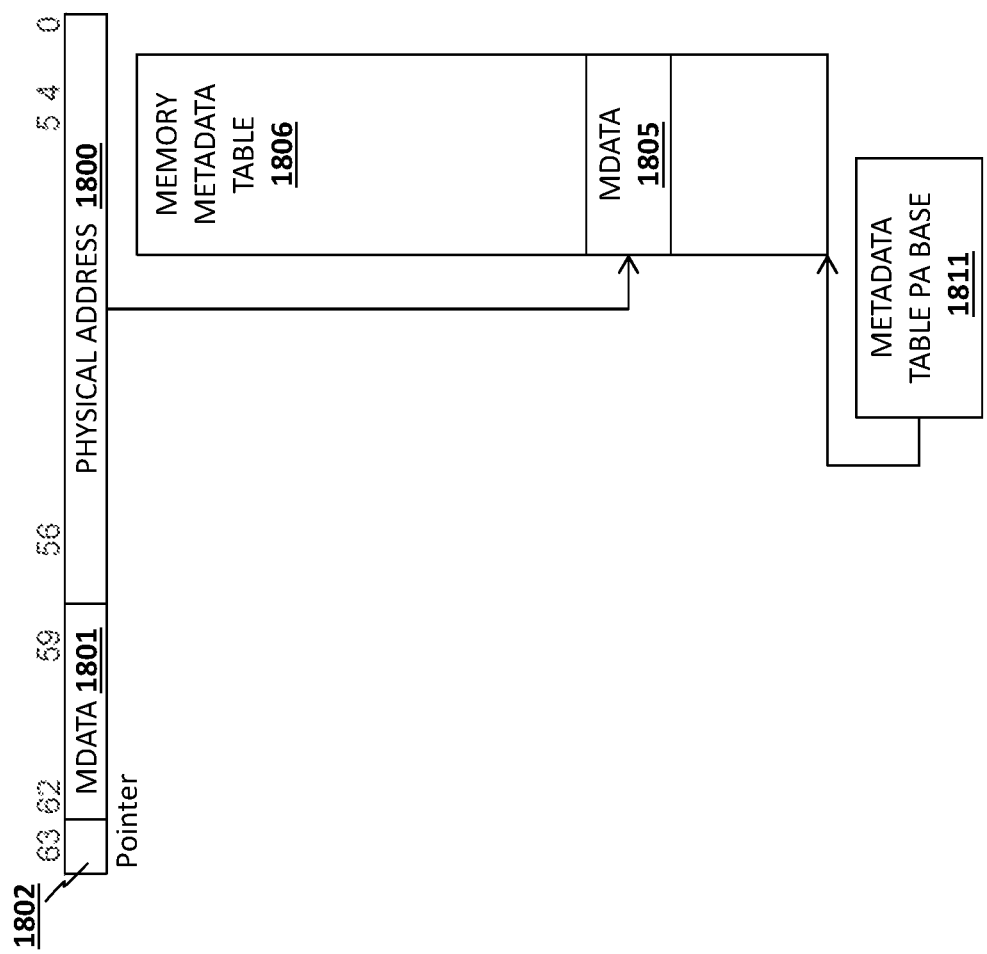
FIG. 18 illustrates an example in which the memory metadata table is in the physical address space.
Figure 19:
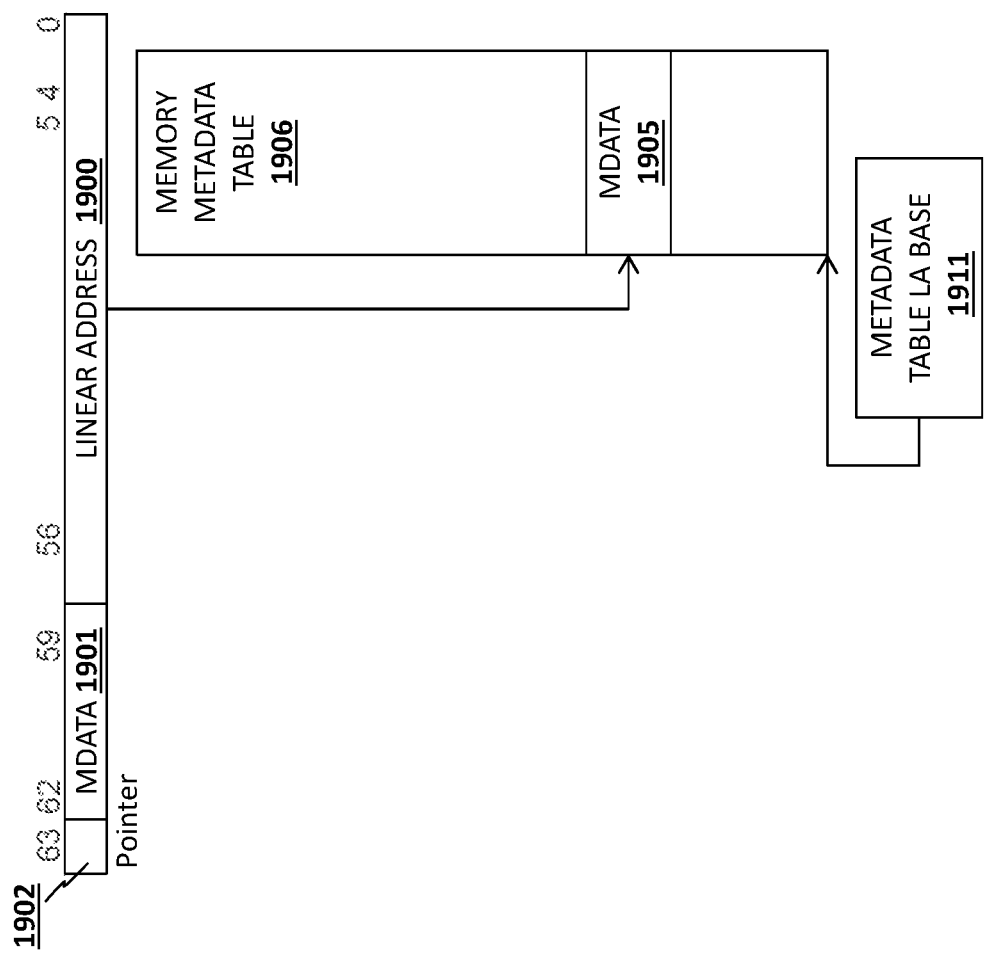
FIG. 19 illustrates an example in which the memory metadata table is in the linear address space.

FIG. 18 illustrates an example in which the memory metadata table 1806 is stored in the physical address space and FIG. 19 illustrates an example in which the memory metadata table 1906 is stored in the linear address space. In FIG. 19, as in prior embodiments, the pointer includes a supervisor/user bit 1202 to indicate an address space associated with supervisor/user privilege levels. A metadata field 1801 comprises the pointer metadata and a physical address

1800 provides an offset to identify a metadata entry 1805 in the memory metadata table 1806. A metadata table PA base address 1811 stored in a control register identifies the base of the memory metadata table 1806 in physical memory.

The embodiment in FIG. 19 includes a pointer with a linear address 1900, metadata 1901, and user/supervisor bit 1902. The metadata table base linear address 1911 is read from a control register and combined with the linear address 1900 of the pointer to identify the metadata entry 1905 within the memory metadata table 1906.

As previously described, once the metadata entry 1905 is identified, it may be compared with the pointer metadata 1801, 1901 included with the address pointer to validate the request.

In one embodiment, each entry in the memory metadata table is a 4-bit value, containing the 4 bits of memory metadata. Note, however, that the underlying principles of the invention are not limited to any particular number of bits or any particular mechanism for storing metadata. In some embodiments, for example, 2-bit metadata values, 8-bit metadata values, or 16-bit metadata values many be used.

As used herein, the "metadata" comprises additional information associated with the underlying data which may be associated with memory or with pointers to memory. A "load" refers to a regular load operation performed in response to a load instruction (or part of an instruction execution) and a "checked load" refers to a load which performs both a load operation and checks the associated metadata. In one embodiment, to check the metadata, the metadata is fetched by either issuing another load to the metadata location or by reading a cache of metadata such as a TLB which contains metadata fields as described above. An "unchecked load" refers to a load which does not perform metadata checking (even if metadata is available).

Similarly, a "store" refers to a regular store operation performed in response to a store instruction (or part of an instruction execution) and a "checked store" refers to a store which performs both a store operation and checks the associated metadata. In one embodiment, to check the metadata, the metadata is fetched by either issuing a load to the metadata location or by reading a cache of metadata such as a TLB which contains metadata fields as described above. An "unchecked store" refers to a store which does not perform metadata checking (even if metadata is available).

In one embodiment, a "metadata store" operation changes or creates the metadata associated with the memory location. Specifically, one implementation includes a metadata store operation which writes to the metadata storage location (e.g., the table in memory). Ordering checks may be implemented to ensure that the metadata store is properly ordered against any checked load operations and/or other store accesses on the same thread. When ordering is performed, the metadata store becomes visible to checked loads and stores on a different thread (either through regular memory store ordering or an eventually-visible method).

A "metadata load" operation loads the metadata from a specified metadata storage location. The metadata may then be used for checking any checked load or checked store operations.

Metadata may be cached in the various processor data caches, and obtained using injected load operations. Alternatively, or in addition, dedicated metadata caches may store the memory metadata.

A. Memory Metadata in Existing Caches and Address Space

In an embodiment in which the memory metadata resides in the system memory address space and can be cached in the various data caches, the memory metadata can be accessed by performing regular read accesses to the memory space. For load operations, the same operation can be executed multiple times to access both metadata and data.

Figure 20:
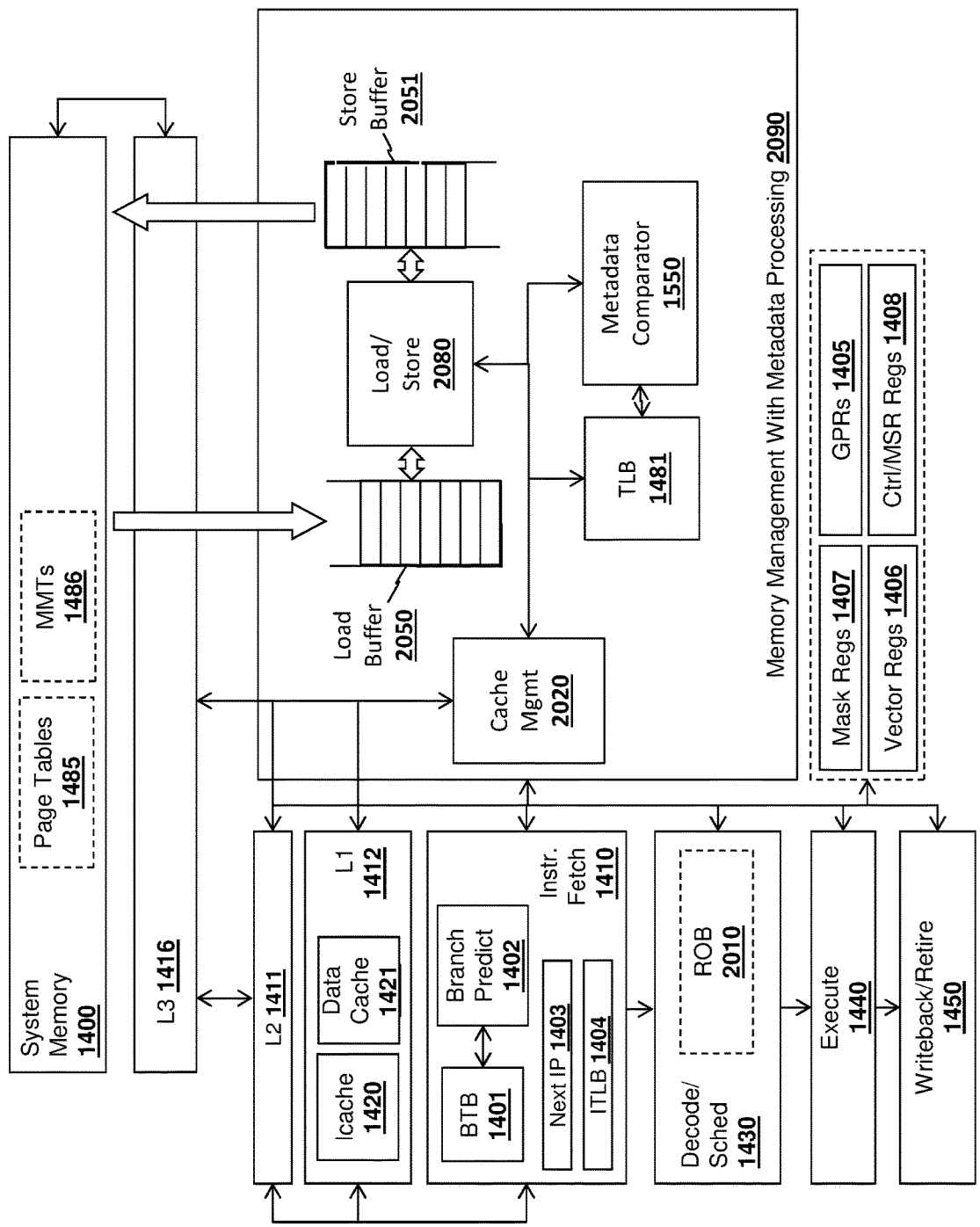
FIG. 20 illustrates additional details for one embodiment of the memory management circuitry.

FIG. 20 illustrates additional details for one embodiment of the memory management circuitry 2090 including the previously described metadata comparator 1550 and TLB 1481. In addition, this embodiment incudes load/store circuitry 1580 for managing a load buffer 2050 and store buffer 2051 each comprising a plurality of entries. Each entry in the load buffer 2050 identifies the data being loaded from memory 1400 for an associated load operation and each entry in the store buffer 2051 identifies data to be stored to memory 1400 for an associated store operation One embodiment of the load/store circuitry 2080 creates a combined entry in the load buffer 2050 for corresponding load data and load metadata operations. A separate load buffer entry may be used for each, but this will unnecessarily consume buffer space and may therefore be less performant. The load/store circuitry 2080 dispatches the combined load operation at least twice: once for fetching the data and a second time to load the metadata for the metadata comparator 1550 to perform the metadata checks.

In one embodiment, the load/store circuitry 2080 accesses the data first in order to release the data dependency chain. This may include, for example, instructions that are waiting for the load operation to complete (i.e., those instructions which depend on the load). The metadata load operation and checking can be performed later (but before retirement).

In some out-of-order machines, the write-back of the data and the write-back to the reorder buffer (ROB) 2010 happen at different times. In one embodiment, the data is loaded first and the checks which would write-back to the ROB 2010 are performed later.

In one embodiment, cache management circuitry 2020 controls the caching policies for caching the metadata in the L1 data cache 1421, the L2 cache 1411 and the L3 cache and implements a coherency protocol to maintain coherency of the metadata. For example, in one embodiment, the cache management circuitry 2020 performs full snooping the in the load buffer 2050 for the meta-data address. Alternatively, or in addition, the cache management circuitry 2020 maintains a Bloom filter to track the meta-data addresses accessed. The cache management circuitry 2020 may invalidate results cause a roll back to a prior execution state when it detects a store operation in the store buffer 2051 violating the coherency.

One embodiment implements an "eventually coherent MTT" architecture in which metadata store operations become visible to checked loads from another thread only after a maximum window of instructions. In one implementation, the maximum window is selected based on the size of the ROB 2010 (e.g., using a ROB-sized number of instructions). One embodiment of the metadata comparator 1550 addresses false failures, for example, by re-checking metadata that have mismatches on retirement, to ensure the mismatch was not caused by a missed snoop operation. Note that this approach deviates from standard memory ordering, but is simple and has minimal impact on the functionality.

In one embodiment, metadata store operations can inject a metadata load operation into the load pipeline in order to check the metadata. These metadata load operations can be either managed by new dedicated entries in the load buffer 2050 or by existing entries which are repurposed to handle metadata load operations only (e.g., repurposed statically or dynamically). In one embodiment, these metadata loads write-back the result of the metadata check to the ROB 2010 on behalf of the store operation. In one embodiment, coherency for metadata store operations is implemented in the same manner as for metadata load operations.

B. Dedicated Metadata Caches

1. Cache Organization: One embodiment of the invention employs one or more of the following organization options for dedicated metadata caching.
   a) Independent Cache, Tag, and Data: One embodiment of the dedicated cache comprises an independent cache with its own tags and data. This dedicated cache may be addressed through the linear (or physical) address of the referenced memory location for which the metadata is cached.
   b) Same Set and Tag as the DTLB: One embodiment uses the data TLB (DTLB) cache structure, caching metadata for the entire small page or a specified portion of it. In this implementation, the metadata cache is organized in the same manner as the DTLB and/or may use the existing DTLB. Saving metadata for larger pages is impractical due to amount of data needed per entry. Due to access locality, loading meta-data in large chunks is beneficial for performance. The metadata caching may be performed after the physical address of the page is obtained by the PMH (page miss handler). The PMH can fetch the metadata for the entire 4K page (or portions of the page) and cache it in the DTLB.

In one embodiment, to permit the cache management circuitry 2020 to perform snooping, the MU cache entries are also tagged with their own physical address. If a Bloom filter is used, a cache invalidate instruction may be executed when it is necessary to flush all of the cached metadata (or large portions of it).

c) Same Sets and Tags as the L1 Data Cache (DCU): One embodiment organizes the metadata for a cache line using the L1 data cache structure.

2. Metadata Cache Lookup: Regardless of which organization options are used, one embodiment of the invention implements a metadata cache lookup for load or store checking in accordance with one or more of the following techniques.
   a) Metadata Cached in the DTLB: When metadata is cached in the DTLB and/or a separate cache with an equivalent cache structure, execution will continue in response to a DTLB hit followed by a validation of the metadata (via the metadata check). In circumstances where there is a DTLB hit but a metadata miss, a page walk is performed to fetch the metadata. Once fetched, the metadata is used to validate the operation. In addition, the metadata may be cached using one or more of the above techniques. In response to a DTLB miss but a metadata hit, a page walk is performed for both the metadata and the data.
   b) Metadata Cached in the DCU: If the metadata is cached in the DCU and/or a separate L1/DCU cache structure, the metadata check may be performed as part of the tag lookup for loads, and may also be performed for stores (e.g., either before or after retirement and requiring only tag lookup and metadata access). In circumstances where the metadata is not available in the cache line, the cache miss needs to be processed to retrieve the metadata.

3. Metadata Cache Fill: Embodiments of the invention may perform cache fills using one or more of the following techniques.
   a) In an embodiment in which DTLB caching is employed, a page walk is performed to translate both the linear address of the load/store and the metadata. Physical address of the load/store can be filled when available. The PMH should monitor in which TLB entry the PA was filled in order to fill the meta-data when available. In case the TLB entry was overwritten no fill should happen.
   b) In an embodiment in which DCU caching is employed, miss handling performs a load to get the metadata and fill it to the DCU structured metadata cache.

C. Meta-Data Cache Coherency and Consistency

In any of the embodiments described above, coherency may be maintained and snooping supported either precisely or using Bloom filters. To maintain consistency (single thread memory ordering), the cache management circuitry 2020 matches metadata stores to metadata load-check load buffer 2050 entries and/or blocks all younger loads. In one embodiment, all blocking stores block all younger checked loads and stores until the metadata is updated.

The embodiments of the invention provide an MU implementation with low impact on the processor or SoC (with core-only changes) as opposed to changing internal and external coherency (multi-socket) protocols. These embodiments also allow trading complexity of the implementation with performance.

In contrast to other processor implementations which extend the data to include metadata throughout the memory hierarchy, or using dedicated cache structures, the embodiments described here inject additional metadata loads into the memory hierarchy, and cache the metadata for subsequent use. Caching can be done in different ways (e.g., in the DCU, along the TLB) using different coherency techniques (e.g., eventually coherent, store order coherency using bloom filters) and/or consistency mechanisms (e.g., fence-like/all blocking stores for metadata stores, full coherence caching, etc).

In the foregoing specification, the embodiments of invention have been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

EXAMPLES

The following are example implementations of different embodiments of the invention.

Example 1. A processor comprising: execution circuitry to execute instructions and process data, at least one instruction to generate a system memory access request having a first address pointer; and address translation circuitry to determine whether to translate the first address pointer with or without metadata processing, wherein if the first address pointer is to be translated with metadata processing, the address translation circuitry to: perform a lookup in a memory metadata table to identify a memory metadata value, determine a pointer metadata value associated with the first address pointer, and compare the memory metadata value with the pointer metadata value, the comparison to generate a validation of the memory access request or a fault condition, wherein if the comparison results in a validation of the memory access request, then accessing a set of one or more address translation tables to translate the first address pointer to a first physical address and to return the first physical address responsive to the memory access request.

Example 2. The processor of example 1 wherein the pointer metadata value comprises a tag value associated with a linear address range.

Example 3. The processor of example 2 wherein the pointer metadata is embedded as a field within the first address pointer, the address translation circuitry to extract the field to determine the pointer metadata value.

Example 4. The processor of example 1 wherein the memory metadata table comprises a flat table or a multi-level table, the address translation circuitry to use one or more address bits from the first address pointer to perform a lookup in the memory metadata table.

Example 5. The processor of example 4 further comprising: at least one control register to store a base address associated with the memory metadata table, the address translation circuitry to combine the base address with one or more address bits from the first address pointer to identify an entry in the memory metadata table.

Example 6. The processor of example 5 wherein the memory metadata table comprises a first memory metadata table, the processor further comprising: a first control register to store a first base address associated with a user mode of execution, the first base address associated with the first memory metadata table; a second control register to store a second base address associated with a supervisor mode of execution, the second base address associated with a second memory metadata table; wherein the address translation circuitry is to select the first base address to identify the first memory metadata table if the memory access request is generated in the user mode and is to select the second base address to identify the second memory metadata table if the memory access request is generated in the supervisor mode.

Example 7. The processor of example 1 wherein a subset of memory regions are to be identified as to require metadata processing, the subset of memory regions to be identified using one or more page table protection keys.

Example 8. The processor of example 1 further comprising: a first control register to store a plurality of bits to indicate whether metadata processing is disabled for load operations and/or store operations.

Example 9. The processor of example 1 wherein the execution circuitry is to execute a first instruction to read a first entry from the memory metadata table to determine the metadata value and is to execute a second instruction to write to the first entry from the memory metadata table to attach the metadata value to the address identified by the memory address pointer.

Example 10. The processor of example 9 wherein the execution circuitry is to execute a third instruction to extract the pointer metadata value from the first address pointer and executing a fourth instruction to embed the pointer metadata value in the first address pointer.

Example 11. A method comprising: generating a system memory access request having a first address pointer responsive to execution of at least one instruction; determine whether to translate the first address pointer with or without metadata processing; performing a lookup in a memory metadata table to identify a memory metadata value if the first address pointer is to be translated with metadata processing; determining a pointer metadata value associated with the first address pointer, and comparing the memory metadata value with the pointer metadata value, the comparison to generate a validation of the memory access request or a fault condition; accessing a set of one or more address translation tables to translate the first address pointer to a first physical address and returning the first physical address in response to a validation.

Example 12. The method of example 11 wherein the pointer metadata value comprises a tag value associated with a linear address range.

Example 13. The method of example 12 wherein the pointer metadata is embedded as a field within the first address pointer, the method further comprising extracting the field to determine the pointer metadata value.

Example 14. The method of example 11 wherein the memory metadata table comprises a flat table or a multi-level table, the method further comprising using one or more address bits from the first address pointer to perform a lookup in the memory metadata table.

Example 15. The method of example 14 further comprising: storing a base address associated with the memory metadata table in at least one control register; and combining the base address with one or more address bits from the first address pointer to identify an entry in the memory metadata table.

Example 16. The method of example 15 wherein the memory metadata table comprises a first memory metadata table and the base address comprises a first base address associated with a user mode of execution, the method further comprising: storing the first base address in a first control register associated with the first memory metadata table; and storing a second base address associated with a supervisor mode of execution in a second control register, the second base address associated with a second memory metadata table; selecting the first base address to identify the first memory metadata table if the memory access request is generated in the user mode; and selecting the second base address to identify the second memory metadata table if the memory access request is generated in the supervisor mode.

Example 17. The method of example 11 wherein a subset of memory regions are to be identified as to require metadata processing, the subset of memory regions to be identified using one or more page table protection keys.

Example 18. The method of example 11 further comprising: reading bits from a first control register to determine whether metadata processing is disabled for load operations and/or store operations.

Example 19. The method of example 11 further comprising: executing a first instruction to read a first entry from the memory metadata table to determine the metadata value; and executing a second instruction to write to the first entry from the memory metadata table to attach the metadata value to the address identified by the memory address pointer.

Example 20. The method of example 19 further comprising: executing a third instruction to extract the pointer metadata value from the first address pointer; and executing a fourth instruction to embed the pointer metadata value in the first address pointer.

Example 21. A machine-readable medium having program code stored thereon which, when executed by a machine, causes the machine to perform the operations of: generating a system memory access request having a first address pointer responsive to execution of at least one instruction; determine whether to translate the first address pointer with or without metadata processing; performing a lookup in a memory metadata table to identify a memory metadata value if the first address pointer is to be translated with metadata processing; determining a pointer metadata value associated with the first address pointer, and comparing the memory metadata value with the pointer metadata value, the comparison to generate a validation of the memory access request or a fault condition; accessing a set of one or more address translation tables to translate the first address pointer to a first physical address and returning the first physical address in response to a validation.

Example 22. The machine-readable medium of example 21 wherein the pointer metadata value comprises a tag value associated with a linear address range.

Example 23. The machine-readable medium of example 22 wherein the pointer metadata is embedded as a field within the first address pointer, the machine-readable medium further comprising program code to cause the field to be extracted to determine the pointer metadata value.

Example 24. The machine-readable medium of example 21 wherein the memory metadata table comprises a flat table or a multi-level table, the machine-readable medium further comprising program code to cause one or more address bits from the first address pointer to be used to perform a lookup in the memory metadata table.

Example 25. The machine-readable medium of example 24 further comprising program code to cause the machine to perform the operations of: storing a base address associated with the memory metadata table in at least one control register; and combining the base address with one or more address bits from the first address pointer to identify an entry in the memory metadata table.

Example 26. The machine-readable medium of example 25 wherein the memory metadata table comprises a first memory metadata table and the base address comprises a first base address associated with a user mode of execution, the machine-readable medium further comprising program code to cause the machine to perform the operations of: storing the first base address in a first control register associated with the first memory metadata table; and storing a second base address associated with a supervisor mode of execution in a second control register, the second base address associated with a second memory metadata table; selecting the first base address to identify the first memory metadata table if the memory access request is generated in the user mode; and selecting the second base address to identify the second memory metadata table if the memory access request is generated in the supervisor mode.

Example 27. The machine-readable medium of example 21 wherein a subset of memory regions are to be identified as to require metadata processing, the subset of memory regions to be identified using one or more page table protection keys.

Example 28. The machine-readable medium of example 21 further comprising program code to cause the machine to perform the operations of: reading bits from a first control register to determine whether metadata processing is disabled for load operations and/or store operations.

Example 29. The machine-readable medium of example 21 further comprising program code to cause the machine to perform the operations of: executing a first instruction to read a first entry from the memory metadata table to determine the metadata value; and executing a second instruction to write to the first entry from the memory metadata table to attach the metadata value to the address identified by the memory address pointer.

Example 30. The machine-readable medium of example 29 further comprising program code to cause the machine to perform the operations of: executing a third instruction to extract the pointer metadata value from the first address pointer; and executing a fourth instruction to embed the pointer metadata value in the first address pointer.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the Figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals —such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A processor comprising:
   execution circuitry to execute instructions and process data, at least one instruction to generate a system memory access request having a first address pointer; and
   address translation circuitry to determine whether to translate the first address pointer with or without metadata processing, wherein if the first address pointer is to be translated with metadata processing, the address translation circuitry to:
      perform a lookup in a memory metadata table to identify a memory metadata value, wherein the memory metadata value is cached in a memory hierarchy of the processor,
      determine a pointer metadata value associated with the first address pointer, and compare the memory metadata value with the pointer metadata value, the comparison to generate a validation of the memory access request or a fault condition, wherein if the comparison results in a validation of the memory access request, then accessing a set of one or more address translation tables to translate the first address pointer to a first physical address and to return the first physical address responsive to the memory access request.

2. The processor of claim 1 wherein the memory metadata table comprises a flat table or a multi-level table, the address translation circuitry to use one or more address bits from the first address pointer to perform a lookup in the memory metadata table.

3. The processor of claim 1, wherein the memory hierarchy of the processor comprises data caches of the processor, and wherein the memory metadata value is accessed by performing a data read access to the data caches of the processor.

4. The processor of claim 1, wherein accessing the memory metadata value comprises combining the memory metadata value with corresponding data in a load buffer.

5. The processor of claim 1, wherein the memory metadata value is cached in a portion of a data translation lookaside buffer, wherein the portion is dedicated to memory metadata values, and wherein the data translation lookaside buffer includes one or more pages for corresponding data.

6. The processor of claim 1, wherein the memory metadata value is cached in a cache entry that is tagged with a physical address.

7. The processor of claim 1 wherein the pointer metadata value comprises a tag value associated with a linear address range.

8. The processor of claim 7 wherein the pointer metadata is embedded as a field within the first address pointer, the address translation circuitry to extract the field to determine the pointer metadata value.

9. The processor of claim 1 wherein the execution circuitry is to execute a first instruction to read a first entry from the memory metadata table to determine the metadata value and is to execute a second instruction to write to the first entry from the memory metadata table to attach the metadata value to the address identified by the memory address pointer.

10. The processor of claim 9 wherein the execution circuitry is to execute a third instruction to extract the pointer metadata value from the first address pointer and executing a fourth instruction to embed the pointer metadata value in the first address pointer.

11. A method comprising:
generating a system memory access request having a first address pointer responsive to execution of at least one instruction;
determine whether to translate the first address pointer with or without metadata processing;
performing a lookup in a memory metadata table to identify a memory metadata value if the first address pointer is to be translated with metadata processing, wherein the memory metadata value is cached in a memory hierarchy of the processor;
determining a pointer metadata value associated with the first address pointer, and
comparing the memory metadata value with the pointer metadata value, the comparison to generate a validation of the memory access request or a fault condition;
accessing a set of one or more address translation tables to translate the first address pointer to a first physical address and returning the first physical address in response to a validation.

12. The method of claim 11 wherein a subset of memory regions are to be identified as to require metadata processing, the subset of memory regions to be identified using one or more page table protection keys.

13. The method of claim 11 further comprising:
reading bits from a first control register to determine whether metadata processing is disabled for load operations and/or store operations.

14. The method of claim 11 further comprising:
executing a first instruction to read a first entry from the memory metadata table to determine the metadata value; and
executing a second instruction to write to the first entry from the memory metadata table to attach the metadata value to the address identified by the memory address pointer.

15. The method of claim 14 further comprising:
executing a third instruction to extract the pointer metadata value from the first address pointer; and
executing a fourth instruction to embed the pointer metadata value in the first address pointer.

16. The method of claim 11 wherein the pointer metadata value comprises a tag value associated with a linear address range.

17. The method of claim 16 wherein the pointer metadata is embedded as a field within the first address pointer, the method further comprising extracting the field to determine the pointer metadata value.

18. The method of claim 11 wherein the memory metadata table comprises a flat table or a multi-level table, the method further comprising using one or more address bits from the first address pointer to perform a lookup in the memory metadata table.

19. The method of claim 18 further comprising:
storing a base address associated with the memory metadata table in at least one control register; and
combining the base address with one or more address bits from the first address pointer to identify an entry in the memory metadata table.

20. The method of claim 19 wherein the memory metadata table comprises a first memory metadata table and the base address comprises a first base address associated with a user mode of execution, the method further comprising:
storing the first base address in a first control register associated with the first memory metadata table; and
storing a second base address associated with a supervisor mode of execution in a second control register, the second base address associated with a second memory metadata table;
selecting the first base address to identify the first memory metadata table if the memory access request is generated in the user mode; and
selecting the second base address to identify the second memory metadata table if the memory access request is generated in the supervisor mode.

21. A non-transitory machine-readable medium having program code stored thereon which, when executed by a machine, causes the machine to perform 11 of:
generating a system memory access request having a first address pointer responsive to execution of at least one instruction;
determine whether to translate the first address pointer with or without metadata processing;

performing a lookup in a memory metadata table to identify a memory metadata value if the first address pointer is to be translated with metadata processing, wherein the memory metadata value is cached in a memory hierarchy of the processor;

determining a pointer metadata value associated with the first address pointer, and comparing the memory metadata value with the pointer metadata value, the comparison to generate a validation of the memory access request or a fault condition;

accessing a set of one or more address translation tables to translate the first address pointer to a first physical address and returning the first physical address in response to a validation.

22. The non-transitory machine-readable medium of claim 21 wherein a subset of memory regions are to be identified as to require metadata processing, the subset of memory regions to be identified using one or more page table protection keys.

23. The non-transitory machine-readable medium of claim 21 further comprising program code to cause the machine to perform the operations of:
reading bits from a first control register to determine whether metadata processing is disabled for load operations and/or store operations.

24. The non-transitory machine-readable medium of claim 21 further comprising program code to cause the machine to perform the operations of:
executing a first instruction to read a first entry from the memory metadata table to determine the metadata value; and
executing a second instruction to write to the first entry from the memory metadata table to attach the metadata value to the address identified by the memory address pointer.

25. The non-transitory machine-readable medium of claim 24 further comprising program code to cause the machine to perform the operations of:
executing a third instruction to extract the pointer metadata value from the first address pointer; and
executing a fourth instruction to embed the pointer metadata value in the first address pointer.

26. The non-transitory machine-readable medium of claim 21 wherein the pointer metadata value comprises a tag value associated with a linear address range.

27. The non-transitory machine-readable medium of claim 26 wherein the pointer metadata is embedded as a field within the first address pointer, the machine-readable medium further comprising program code to cause the field to be extracted to determine the pointer metadata value.

28. The non-transitory machine-readable medium of claim 21 wherein the memory metadata table comprises a flat table or a multi-level table, the machine-readable medium further comprising program code to cause one or more address bits from the first address pointer to be used to perform a lookup in the memory metadata table.

29. The non-transitory machine-readable medium of claim 28 further comprising program code to cause the machine to perform the operations of:
storing a base address associated with the memory metadata table in at least one control register; and
combining the base address with one or more address bits from the first address pointer to identify an entry in the memory metadata table.

30. The non-transitory machine-readable medium of claim 29 wherein the memory metadata table comprises a first memory metadata table and the base address comprises a first base address associated with a user mode of execution, the machine-readable medium further comprising program code to cause the machine to perform the operations of:
storing the first base address in a first control register associated with the first memory metadata table; and
storing a second base address associated with a supervisor mode of execution in a second control register, the second base address associated with a second memory metadata table;
selecting the first base address to identify the first memory metadata table if the memory access request is generated in the user mode; and
selecting the second base address to identify the second memory metadata table if the memory access request is generated in the supervisor mode.

* * * * *